(12) United States Patent
Duan et al.

(10) Patent No.: US 12,283,696 B2
(45) Date of Patent: Apr. 22, 2025

(54) HOLEY GRAPHENE FRAMEWORK COMPOSITES FOR ULTRA-HIGH RATE ENERGY STORAGE AND METHODS OF PREPARING SUCH COMPOSITES

(71) Applicant: The Regents of the University of California, Oakland, CA (US)

(72) Inventors: Xiangfeng Duan, Los Angeles, CA (US); Yu Huang, Los Angeles, CA (US); Hongtao Sun, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 938 days.

(21) Appl. No.: 17/239,267

(22) Filed: Apr. 23, 2021

(65) Prior Publication Data

US 2021/0242468 A1 Aug. 5, 2021

Related U.S. Application Data

(62) Division of application No. 15/714,883, filed on Sep. 25, 2017, now Pat. No. 11,011,755.

(Continued)

(51) Int. Cl.
*H01M 4/80* (2006.01)
*C01B 32/194* (2017.01)
(Continued)

(52) U.S. Cl.
CPC ............ *H01M 4/80* (2013.01); *C01B 32/194* (2017.08); *H01G 11/26* (2013.01); *H01G 11/36* (2013.01); *H01G 11/46* (2013.01); *H01G 11/70* (2013.01); *H01G 11/86* (2013.01); *H01M 4/0471* (2013.01); *H01M 4/13* (2013.01);
(Continued)

(58) Field of Classification Search
None
See application file for complete search history.

(56) References Cited

U.S. PATENT DOCUMENTS

| | | | |
|---|---|---|---|
| 2011/0111303 A1 | 5/2011 | Kung et al. | |
| 2012/0288750 A1 | 11/2012 | Kung et al. | |
| 2014/0065464 A1 | 3/2014 | Masarapu et al. | |

FOREIGN PATENT DOCUMENTS

| | | |
|---|---|---|
| CN | 105789569 A | 7/2016 |
| CN | 105900200 A | 8/2016 |

(Continued)

OTHER PUBLICATIONS

Chen et al., "Hierarchically porous graphene-based hybrid electrodes with excellent electrochemical performance", Journal of Materials Chemistry A, vol. 1, No. 33, Feb. 11, 2013, pp. 9409-9413 and associated Supporting Information (15 pages).

(Continued)

*Primary Examiner* — Robert S Carrico
(74) *Attorney, Agent, or Firm* — Foley & Lardner LLP

(57) ABSTRACT

A method of forming an electrode material includes: (1) loading an electrochemically active material onto graphene sheets; (2) combining the electrochemically active material-loaded graphene sheets with holey graphene oxide sheets to form a mixture; and (3) treating the mixture under reducing conditions to form a composite including a graphene framework loaded with the electrochemically active material.

19 Claims, 16 Drawing Sheets

Related U.S. Application Data

(60) Provisional application No. 62/399,827, filed on Sep. 26, 2016.

(51) Int. Cl.

| | | |
|---|---|---|
| *H01G 11/26* | (2013.01) | |
| *H01G 11/36* | (2013.01) | |
| *H01G 11/46* | (2013.01) | |
| *H01G 11/70* | (2013.01) | |
| *H01G 11/86* | (2013.01) | |
| *H01M 4/04* | (2006.01) | |
| *H01M 4/13* | (2010.01) | |
| *H01M 4/131* | (2010.01) | |
| *H01M 4/139* | (2010.01) | |
| *H01M 4/1391* | (2010.01) | |
| *H01M 4/36* | (2006.01) | |
| *H01M 4/38* | (2006.01) | |
| *H01M 4/48* | (2010.01) | |
| *H01M 4/485* | (2010.01) | |
| *H01M 4/505* | (2010.01) | |
| *H01M 4/58* | (2010.01) | |
| *H01M 4/62* | (2006.01) | |
| *H01M 4/66* | (2006.01) | |
| *B82Y 30/00* | (2011.01) | |
| *B82Y 40/00* | (2011.01) | |
| *H01M 4/02* | (2006.01) | |
| *H01M 4/525* | (2010.01) | |

(52) U.S. Cl.
CPC ........... *H01M 4/131* (2013.01); *H01M 4/139* (2013.01); *H01M 4/1391* (2013.01); *H01M 4/366* (2013.01); *H01M 4/48* (2013.01); *H01M 4/483* (2013.01); *H01M 4/62* (2013.01); *H01M 4/625* (2013.01); *H01M 4/663* (2013.01); *H01M 4/667* (2013.01); *B82Y 30/00* (2013.01); *B82Y 40/00* (2013.01); *C01P 2006/40* (2013.01); *H01M 2004/021* (2013.01); *H01M 4/386* (2013.01); *H01M 4/387* (2013.01); *H01M 4/485* (2013.01); *H01M 4/505* (2013.01); *H01M 4/525* (2013.01); *H01M 4/5825* (2013.01); *Y10S 977/734* (2013.01); *Y10S 977/846* (2013.01); *Y10S 977/948* (2013.01)

(56) References Cited

FOREIGN PATENT DOCUMENTS

| JP | 2014-518835 A | | 8/2014 | |
|---|---|---|---|---|
| KR | 20160013725 A | * | 2/2016 | ............... B82B 3/00 |
| WO | WO-2012/154183 A1 | | 11/2012 | |
| WO | WO-2015/069332 A1 | | 5/2015 | |
| WO | WO-2015/075294 A1 | | 5/2015 | |
| WO | WO-2016/145106 A1 | | 9/2016 | |
| WO | WO-2016/191564 A1 | | 12/2016 | |
| WO | WO-2017/123532 A1 | | 7/2017 | |
| WO | WO-2017/132282 A1 | | 8/2017 | |

OTHER PUBLICATIONS

Extended European Search Report on EP Application No. 17854092.8 dated Apr. 23, 2020, 10 pages.
Final Office Action on U.S. Appl. No. 15/714,883 dated Jan. 3, 2020, 13 pages.
First Office Action on CN 201780068895.4 dated Nov. 3, 2020.
Foreign Action other than Search Report on TW 106132842 DTD Feb. 20, 2021.
International Search Report and Written Opinion on PCT Application No. PCT/US2017/053308 dated Dec. 11, 2017, 8 pages.
Jiang et al., "Randomly stacked holey graphene anodes for lithium ion batteries with enhanced electrochemical performance", Journal of Materials Chemistry A, vol. 1, May 3, 2013, pp. 7775-7781.
Kong et al., "Free-Standing T-Nb2O5/Graphene Composite Papers with Ultrahigh Gravimetric/Volumetric Capacitance for Li-Ion Intercalation Pseudocapacitor", ACS Nano, vol. 9, No. 11, Sep. 29, 2015, pp. 11200-11208.
Non-Final Office Action on U.S. Appl. No. 15/714,883 DTD Jun. 23, 2020.
Non-Final Office Action on U.S. Appl. No. 15/714,883 dated Aug. 8, 2019, 8 pages.
Notice of Allowance on U.S. Appl. No. 15/714,883 DTD Feb. 3, 2021.
Xu et al., "Holey graphene frameworks for highly efficient capacitive energy storage", Nature Communications, vol. 5, No. 4554, Aug. 8, 2014, pp. 1-8.
Xu et al., "Solution Processable Holey Graphene Oxide and Its Derived Macrostructures for High-Performance Supercapacitors", Nano Letters, vol. 15, Jun. 9, 2015, pp. 4605-4610.
Yang et al., "High performance graphene/manganese oxide hybrid electrode with flexible holey structure", Electrochimica Acta, vol. 129, Mar. 6, 2014, pp. 237-244.
Zhao et al., "Incorporation of Manganese Dioxide within Ultraporous Activated Graphene for High-Performance Electrochemical Capacitors", ACS Nano, vol. 6, No. 6, May 3, 2012, pp. 5404-5412.
Foreign Action other than Search Report on JP 2019-515897 DTD Jul. 19, 2021.
Foreign Action other than Search Report on TW 106132842 DTD Dec. 9, 2021.
Second Office Action on CN 201780068895.4 dated Jun. 9, 2021.

* cited by examiner

Figure 20

Table 1. Comparison of performance metrics of energy storage materials.

Notes:
[1] The gravimetric capacities are normalized by the total mass of electrodes including binders and carbon black; capacities in brackets are normalized by the active materials.
[2] Assuming metal current collector is about 10 mg cm$^{-2}$.
[3] Calculated based on the industry standard (active materials account for about 33% of total weight of the package when assuming the mass loading of the active materials is about 10 mg cm$^{-2}$).

HOLEY GRAPHENE FRAMEWORK COMPOSITES FOR ULTRA-HIGH RATE ENERGY STORAGE AND METHODS OF PREPARING SUCH COMPOSITES

CROSS-REFERENCE TO RELATED APPLICATION

This application is a Divisional Application of U.S. application Ser. No. 15/714,883, filed Sep. 25, 2017, which claims the benefit of U.S. Provisional Application No. 62/399,827, filed Sep. 26, 2016, the content of which is incorporated herein by reference in its entirety.

TECHNICAL FIELD

This disclosure generally relates to graphene framework composites and, more particularly, to holey graphene framework composites for energy storage and other applications.

BACKGROUND

With the growing demand for mobile energy supply from portable electronics to large-scale energy storage applications including electrical vehicles (EVs) and utility grids, extensive research efforts have been devoted to developing energy storage devices with both high energy and high power densities. In general, batteries and supercapacitors (SCs) represent two complementary energy storage technologies, with batteries offering a high energy density but a low power density, and SCs offering a superior power density and cycling endurance but poor energy density. It has been a long standing challenge to develop an energy storage device exhibiting both a high energy density (battery-like) and high power density (SC-like) at the same time. Although this gap has become narrower by continued improvement in the power density and cycle life in batteries, and enhanced energy density in SCs by employing various nanostructured electrode materials, considerable challenge remains to translate improved performance into practical devices. In particular, the improved performance metrics reported in such nanostructured materials to date are typically achieved in ultra-thin films with a rather low mass loading of active electrode materials (e.g., about 0.2-1.0 mg $cm^{-2}$). These reported performance metrics do not provide proper evaluation of the true performance of practical devices. With the extremely low mass loading and high overhead from other passive components in practical devices (e.g., current collectors and separators, >about 10 mg $cm^{-2}$), the improved performance achieved in an ultra-thin electrode often fails to hold up when all device components are included. Considering nearly constant areal specific overhead from current collectors and separators, areal specific performance metrics are desired for properly evaluating the practical significance of an electrode design. Despite considerable efforts along with various materials explored to date, the scaled areal capacity or current density rarely exceeds those of current Li-ion batteries (about 3 mAh $cm^{-2}$, about 4 mA $cm^{-2}$) by a large extent.

It is against this background that a need arose to develop the embodiments described herein.

SUMMARY

Nanostructured electrode materials have shown considerable promise for high rate or high capacity energy storage. However, the improved performance is often achieved in electrodes with rather low areal mass loading (e.g., <about 1 mg $cm^{-2}$), and cannot be readily scaled to an electrode with practical mass loading (e.g., >about 10 mg $cm^{-2}$) due to the rapidly degrading ion diffusion kinetics in thicker electrodes. Despite considerable efforts to date, the scaled areal current density of these electrodes rarely exceeds that of current Li-ion batteries (about 4 mA $cm^{-2}$). To sustain the same or similar gravimetric capacity or current density in thicker electrode (e.g., about 10 mg $cm^{-2}$ vs. about 1 mg $cm^{-2}$) involves both high ion transport rate and high electron transport rate to deliver about 10 times more charge over about 10 times longer distance in a given time, which represents a fundamental challenge in electrode design rather than a straightforward engineering scaling matter. Herein some embodiments are directed to the design of a hierarchically porous holey graphene framework (HGF) as a conductive scaffold for niobia ($Nb_2O_5$) to ensure excellent transport properties for both ions and electrons and provide ultra-high rate energy storage. By systematically tailoring a porosity in a holey graphene backbone, the charge transport in the $Nb_2O_5$/HGF composite electrodes can be optimized to deliver excellent electrochemical performance at practical mass loading (>about 10 mg $cm^{-2}$), with an unprecedented areal capacity up to about 3.9 mAh $cm^{-2}$ (or more) and current density up to about 440 mA $cm^{-2}$ (or more), far exceeding that reported for other electrodes. The achievement of high area capacity and high rate capability at large mass loading opens a path towards practical devices.

The approach represents a general approach for forming a three-dimensional HGF composite and using such a composite for energy storage applications, or capacitive desalinization and water purification. Other HGF composites can be formed to conjugate with silicon, tin, $Fe_3O_4$, germanium, antimony, $SnO_x$, and so forth for anodes, and with $CoO_2$, $LiFePO_4$, sulfur, phosphorous, and so forth for high energy and high power cathodes.

In some embodiments, a method of forming an electrode material includes: (1) loading an electrochemically active material onto graphene sheets; (2) combining the electrochemically active material-loaded graphene sheets with holey graphene oxide sheets to form a mixture; and (3) treating the mixture under reducing conditions to form a composite including a graphene framework loaded with the electrochemically active material.

In some embodiments of the method, the electrochemically active material includes nanostructures of an anode material or a cathode material.

In some embodiments of the method, loading the electrochemically active material includes: loading a precursor of the electrochemically active material onto graphene oxide sheets; and treating the precursor-loaded graphene oxide sheets under reducing conditions to form the electrochemically active material-loaded graphene sheets.

In some embodiments of the method, the holey graphene oxide sheets have basal-plane nanopores of sizes up to about 100 nm.

In some embodiments of the method, the method further includes forming the holey graphene oxide sheets by exposing graphene oxide sheets to an etchant.

In some embodiments of the method, treating the mixture includes: heating the mixture in the presence of a reducing agent to form a gel including the electrochemically active material; and heating the gel to form the composite.

In some embodiments of the method, the graphene framework includes an interconnected porous network of holey graphene sheets and the graphene sheets.

In some embodiments of the method, the electrochemically active material is selectively loaded onto the graphene sheets.

In some embodiments of the method, a mass loading of the electrochemically active material in the composite is about 50 wt. % or more.

In some embodiments, an electrode structure includes a composite including: (1) a graphene framework including interconnected graphene sheets and holey graphene sheets; and (2) an electrochemically active material loaded onto the graphene framework.

In some embodiments of the electrode structure, the electrochemically active material is selectively loaded onto the graphene sheets.

In some embodiments of the electrode structure, a mass loading of the electrochemically active material in the composite is about 50 wt. % or more.

In some embodiments of the electrode structure, a mass loading of the electrochemically active material in the composite is about 70 wt. % or more.

In some embodiments of the electrode structure, the electrochemically active material includes nanostructures.

In some embodiments of the electrode structure, the holey graphene oxide sheets have basal-plane nanopores of sizes up to about 100 nm.

In some embodiments of the electrode structure, a mass ratio of the graphene sheets relative to the holey graphene sheets is up to about 1.5/1.

In some embodiments of the electrode structure, a specific surface area of the composite is about 50 $m^2$ $g^{-1}$ or more.

In some embodiments of the electrode structure, the electrode structure further includes a current collector, and the composite is connected to the current collector.

In some embodiments, an energy storage device includes a first electrode, a second electrode, and an electrolyte that is disposed between the first electrode and the second electrode. At least one of the first electrode or the second electrode includes a composite including: (1) a graphene framework including interconnected graphene sheets and holey graphene sheets; and (2) an electrochemically active material loaded onto the graphene framework.

In some embodiments of the energy storage device, the electrochemically active material is selectively loaded onto the graphene sheets.

In some embodiments of the energy storage device, a mass loading of the electrochemically active material in the composite is about 50 wt. % or more.

Other aspects and embodiments of this disclosure are also contemplated. The foregoing summary and the following detailed description are not meant to restrict this disclosure to any particular embodiment but are merely meant to describe some embodiments of this disclosure.

BRIEF DESCRIPTION OF THE DRAWINGS

For a better understanding of the nature and objects of some embodiments of this disclosure, reference should be made to the following detailed description taken in conjunction with the accompanying drawings.

(b=0.91) up to about 5 mV s$^{-1}$ demonstrates the fast surface-controlled mechanism, and the power factor of about 0.6 for scan rates from about 5 to about 50 mV s$^{-1}$ indicates the mechanism between surface and semi-infinite controlled diffusion. While for Nb$_2$O$_5$/GF electrode the fast surface-controlled mechanism can be maintained up to about 1.0 mV s$^{-1}$, and beyond that, the semi-infinite linear diffusion is dominated (b=0.52). The fast kinetics was demonstrated using electrodes at practical mass loading (about 11 mg cm$^{-2}$) in (f).

Figure 4:
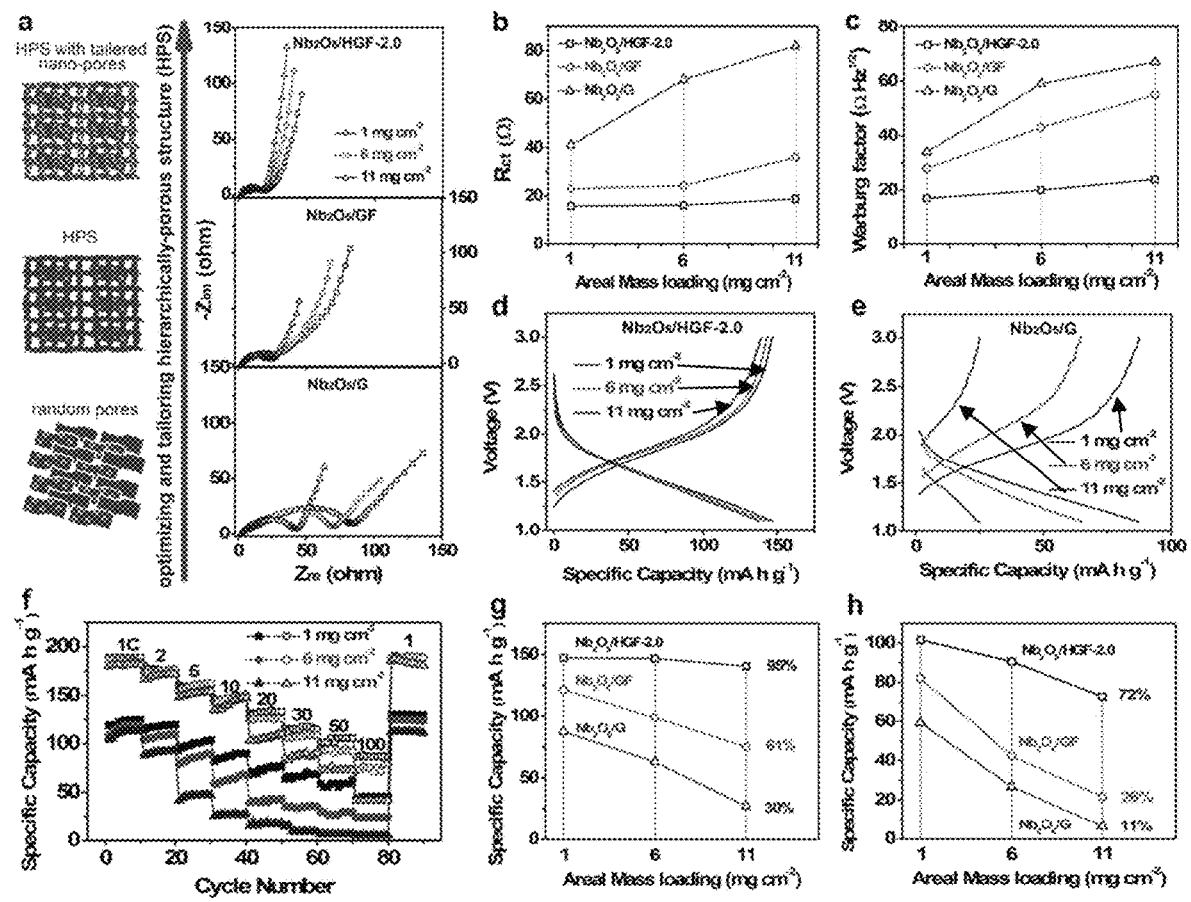

FIG. 4. Mass loading dependent electrochemical characteristics. a-c, Comparison of Nyquist plots obtained from potentiostatic EIS at open-circuit potential (a), and the corresponding mass dependent variation of charge transfer resistance (b) and Warburg factor (c) for Nb$_2$O$_5$/HGF-2.0, Nb$_2$O$_5$/GF and Nb$_2$O$_5$/G electrodes. With increasing mass loading, both charge transfer resistance and Warburg factor are increased almost by twofold for Nb$_2$O$_5$/G control electrodes, while both parameters are slightly increased for Nb$_2$O$_5$/HGF-2.0 electrode. d, e, Galvanostatic charge-discharge curves of 3D Nb$_2$O$_5$/HGF-2.0 electrode (d) and Nb$_2$O$_5$/G control electrode (e) at rate of about 10 C for various mass loadings from about 1 to about 11 mg cm$^{-2}$. Nb$_2$O$_5$/HGF-2.0 electrode do not show apparent capacity reduction and voltage drop with increasing mass loading, while Nb$_2$O$_5$/G control electrode shows severe capacity degradation as well as increasingly steeper slope and larger voltage drop with increasing mass loading, indicating an increasingly larger internal resistance. f, Comparison of the rate performance (about 1-100 C) of Nb$_2$O$_5$/HGF-2.0 (hollow) and Nb$_2$O$_5$/G (solid) electrodes under different mass loadings (about 1, about 6 and about 11 mg cm$^{-2}$). It is evident that Nb$_2$O$_5$/HGF-2.0 electrode can deliver much higher capacities than Nb$_2$O$_5$/G electrode at various rates. g, h, Comparison of the retention of specific capacities at about 10 C (g) and about 50 C (h) as mass loading increasing from about 1 to about 11 mg cm$^{-2}$. About 95% (@ about 10 C) and about 72% (@ about 50 C) of the capacity can be maintained for Nb$_2$O$_5$/HGF-2.0 electrode with increasing mass loading up to about 11 mg cm$^{-2}$, compared with about 30% (@ about 10 C) and about 11% (@ about 50 C) capacity retention for Nb$_2$O$_5$/G electrode with a mass loading of about 11 mg cm$^{-2}$. All the electrochemical properties of freestanding Nb$_2$O$_5$/HGF-2.0 and Nb$_2$O$_5$/GF electrodes were normalized by the total weight of the electrode materials (free of conductive additives and binders); the control Nb$_2$O$_5$/G electrodes were normalized by the total weight of the electrode materials (including binders and conductive additives).

Figure 5:
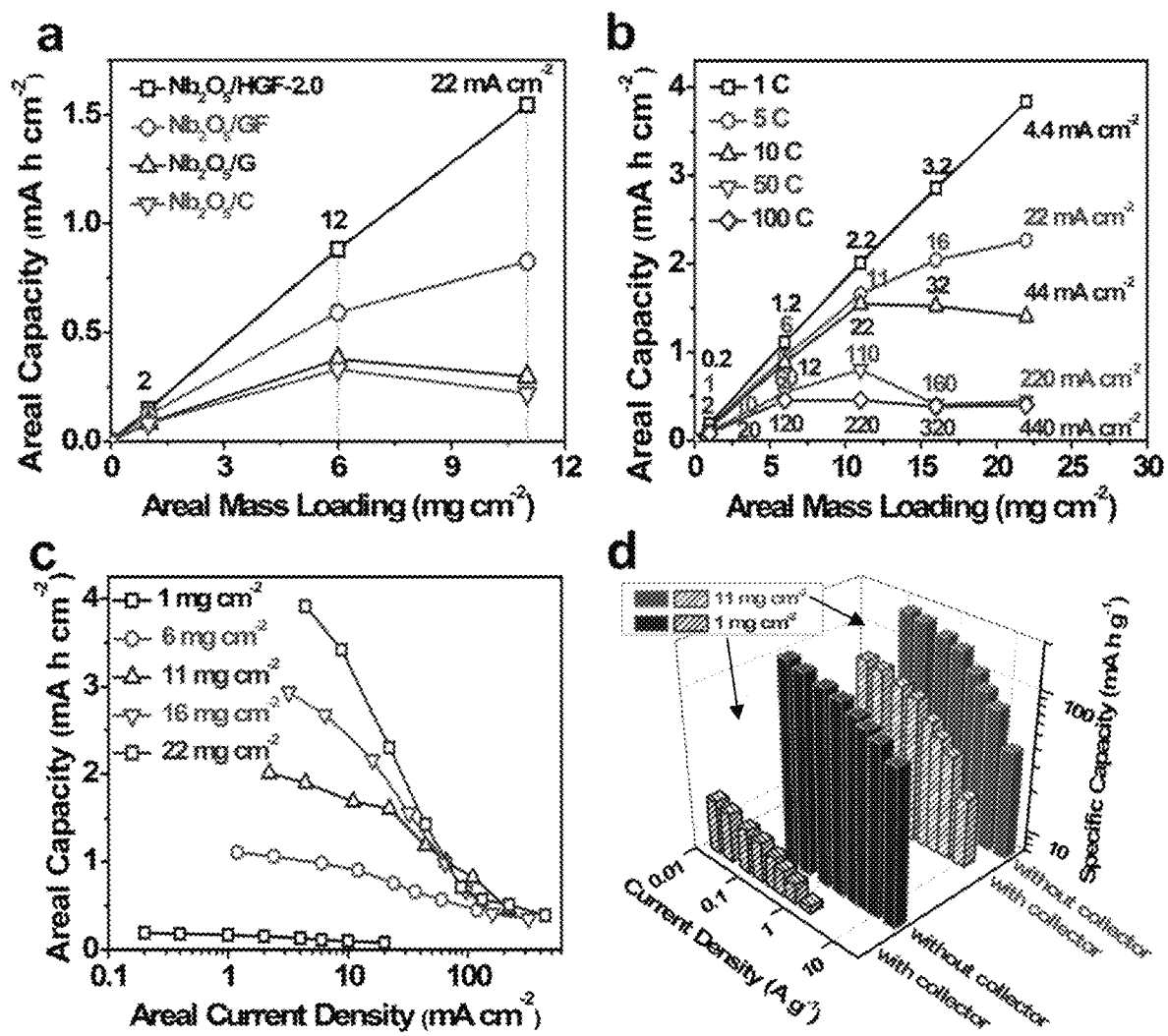

FIG. 5. True performance metrics of high mass loading electrodes. a, Comparison of mass loading dependent areal capacity at about 10 C for Nb$_2$O$_5$/HGF-2.0, Nb$_2$O$_5$/GF, Nb$_2$O$_5$/G, and Nb$_2$O$_5$/C electrodes. The areal capacity increases nearly linearly with the mass loading for the Nb$_2$O$_5$/HGF-2.0 electrode. In contrast, the control electrodes Nb$_2$O$_5$/GF, Nb$_2$O$_5$/G and Nb$_2$O$_5$/C all deliver substantially lower areal capacity at the same mass loading, and do not show a linear scaling relation with mass loading. b, The correlation of areal capacity and areal mass loading at various C-rates. As the C-rate increases, a further increase of mass does not result in proportionally larger capacity due to insufficient ion delivering capability. c, Areal capacities vs. areal current density at various mass loading (about 1-22 mg cm$^{-2}$). The capacity for various mass loadings is maintained until a threshold current density is reached, indicating the onset of charge transport constraint. d, Translation of specific capacities at various current densities when the weight of metal current collectors (about 10 mg cm$^{-2}$) is taken into account. For an electrode with a high mass loading of about 11 mg cm$^{-2}$, the specific capacity and current density will be reduced by about twofold if considering the mass of current collector, while for an electrode with a low mass loading of about 1 mg cm$^{-2}$, the corresponding performance metrics are reduced by about 11 times.

Figure 6:
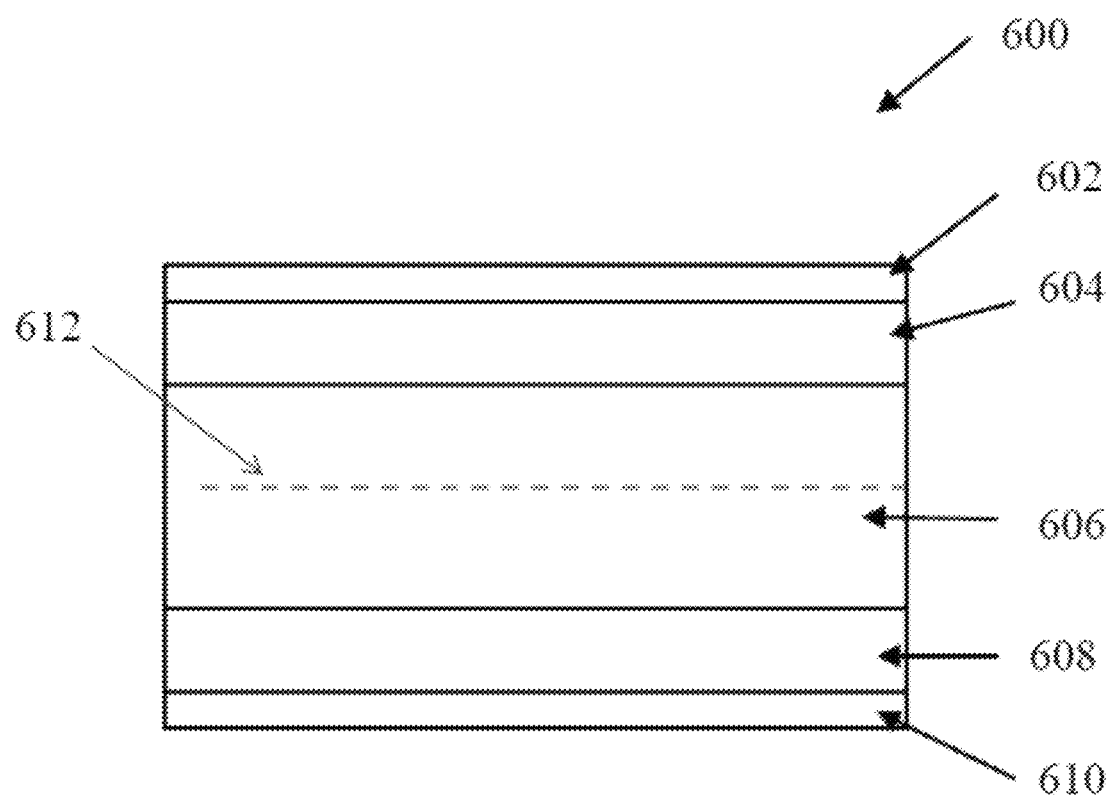

FIG. 6. Schematic of a battery according to some embodiments of this disclosure.

Figure 7:
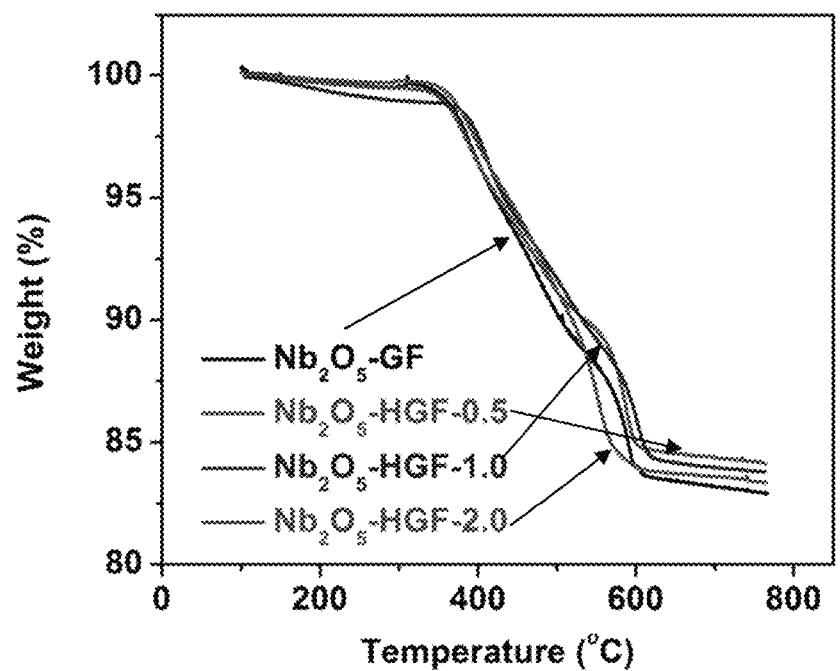

FIG. 7. Thermogravimetric analysis of Nb$_2$O$_5$-GF, Nb$_2$O$_5$-HGF-0.5, Nb$_2$O$_5$-HGF-1.0 and Nb$_2$O$_5$-HGF-2.0 electrodes.

Figure 8:
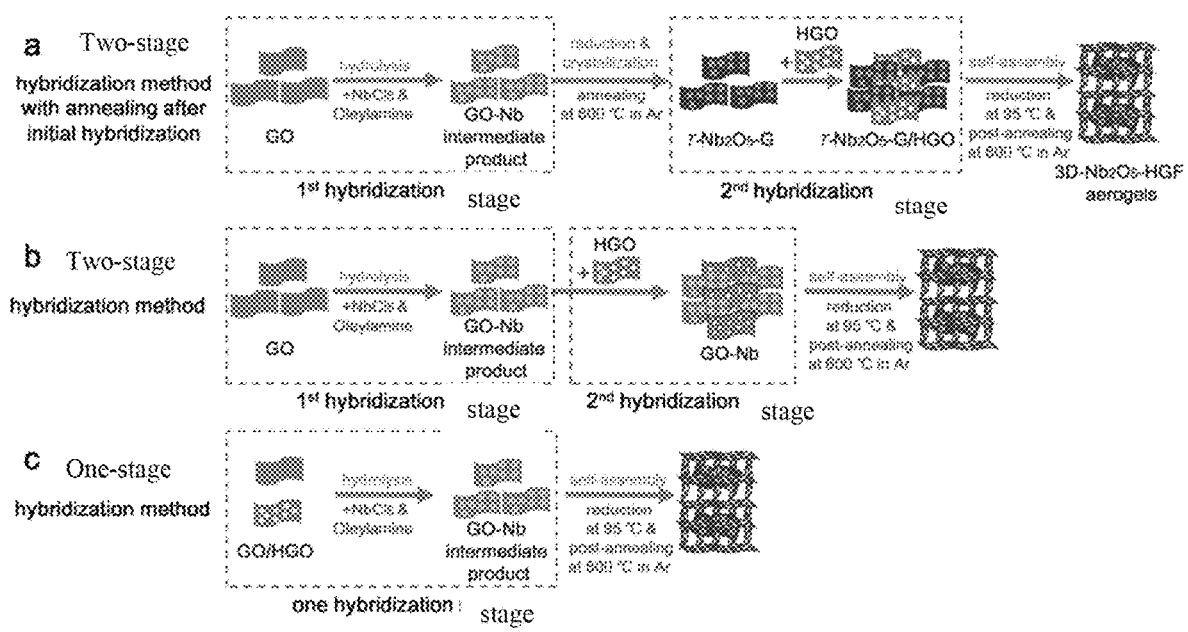

FIG. 8. a, Method 1 (of some embodiments of this disclosure): two-stage hybridization method with annealing after each hybridization stage to prepare Nb$_2$O$_5$-HGF electrodes. b, Method 2: two-stage hybridization method without annealing after initial hybridization. c, Method 3: one-stage hybridization method.

Figure 9:
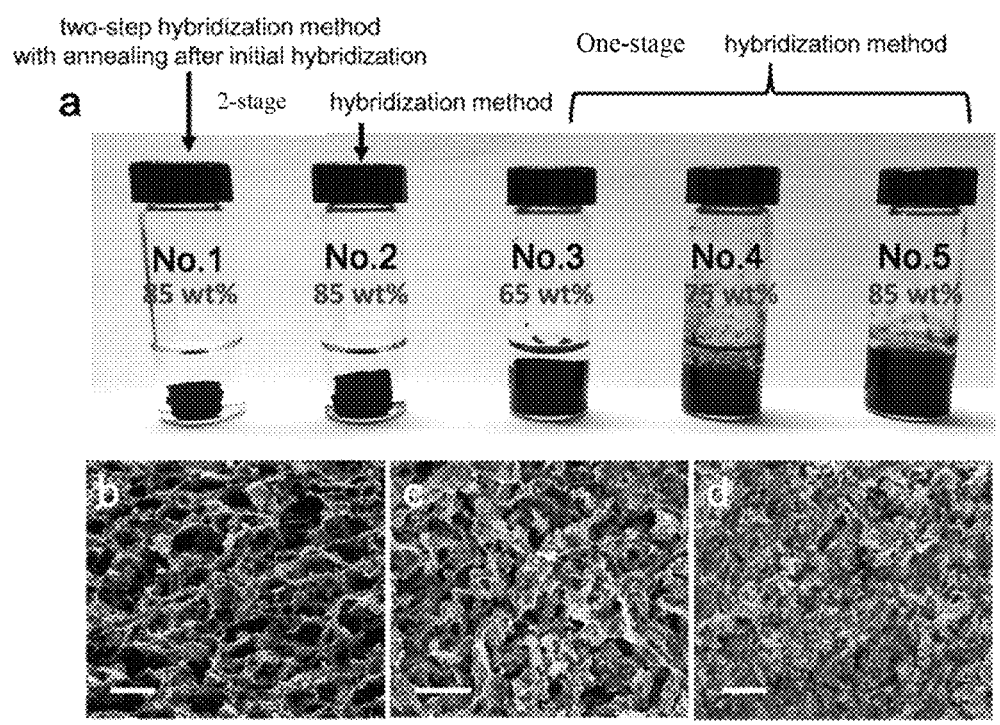

FIG. 9. a, Comparison of hydrogels formed using different synthesis methods. Sample No. 1, No. 2 and No. 5 are the products at the same Nb$_2$O$_5$ weight percentage upon reduction-induced self-assembly using method 1, 2 and 3 respectively. Sample No. 3 and No. 4 are the products using one-stage method but at lower Nb$_2$O$_5$ weight percentages (about 65 and about 75 wt. %). b-d, Cross-sectional SEM images of Sample No. 1, No. 2 and No. 3 after post-synthesis annealing. The scale bars are 10 μm in (b-d).

Figure 10:
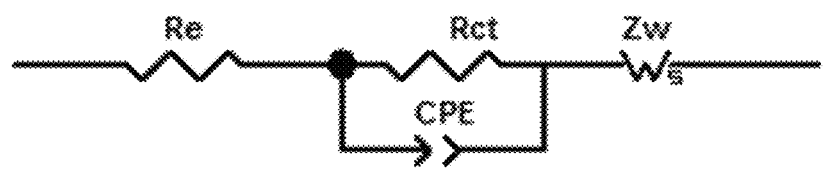

FIG. 10. Modified Randles equivalent circuit. Re is ohmic resistance originating from electron contact resistance, electron resistance of the electrode, and electrolyte resistance, CPE and R$_{ct}$ are the double layer capacitance and charge-transfer resistance respectively, and Z$_w$, is the Warburg impedance related to the diffusion of lithium ions into the bulk electrode.

Figure 11:
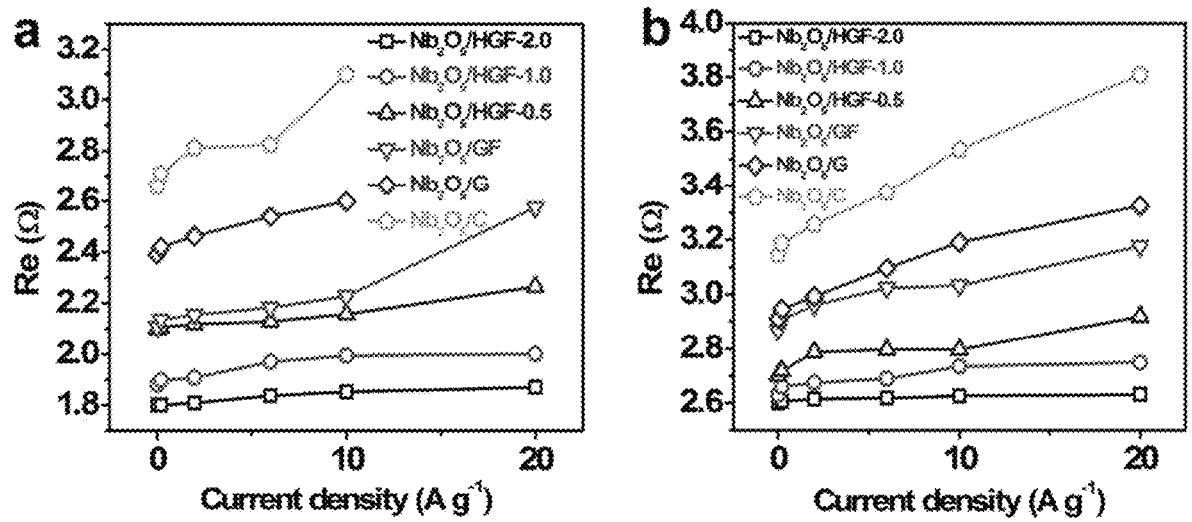

FIG. 11. Ohmic resistance (R$_o$) at various current densities derived from galvanostatic EIS. a, Measured at about 2.5 V during various charging current densities. b, Measured at about 1.1 V during various discharging current densities.

Figure 12:
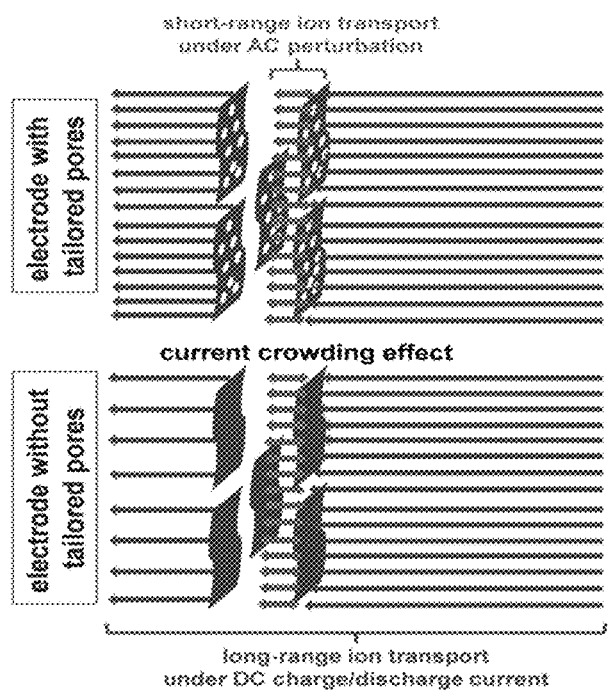

FIG. 12. Schematic illustration of ion transport under high charge/discharge current. A 3D electrode with optimal trailored nanopores shows a nearly uncompromised ion transport capability at high charge/discharge current, while an electrode without tailored pores shows a considerably slowed ion transport through the electrode due to a current crowding effect. It should be noted that potentiostatic/galvanostatic EIS studies primarily measure the ion transport in short distance under an alternating current (AC) perturbation, which is distinct from the charge/discharge process that involves long-range ion transport across the entire electrode thickness under a direct current (DC). The difference between the electrodes with and without tailored pores can be even greater under charge/discharge process in which the ions have to traverse the entire electrode thickness.

Figure 13:
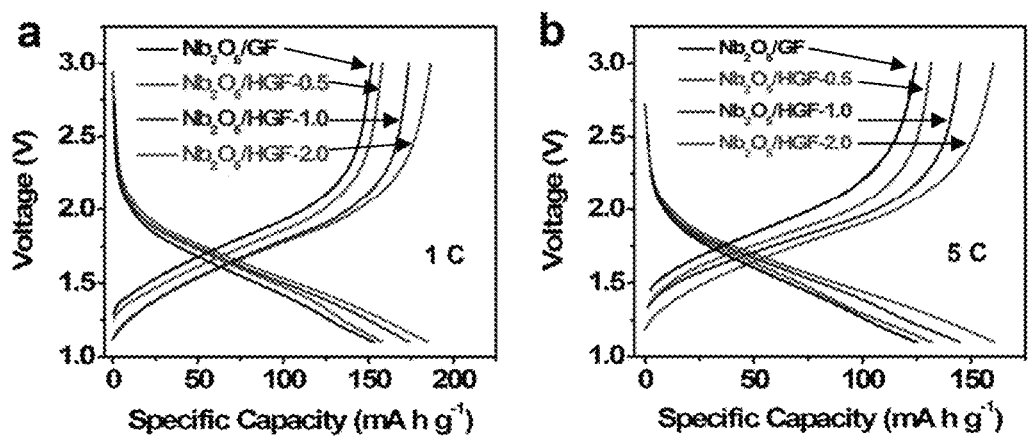

FIG. 13. Galvanostatic charge-discharge curves for 3D composite electrodes with tunable pores. a, At a rate of about 1 C. b, At a rate of about 5 C.

Figure 14:
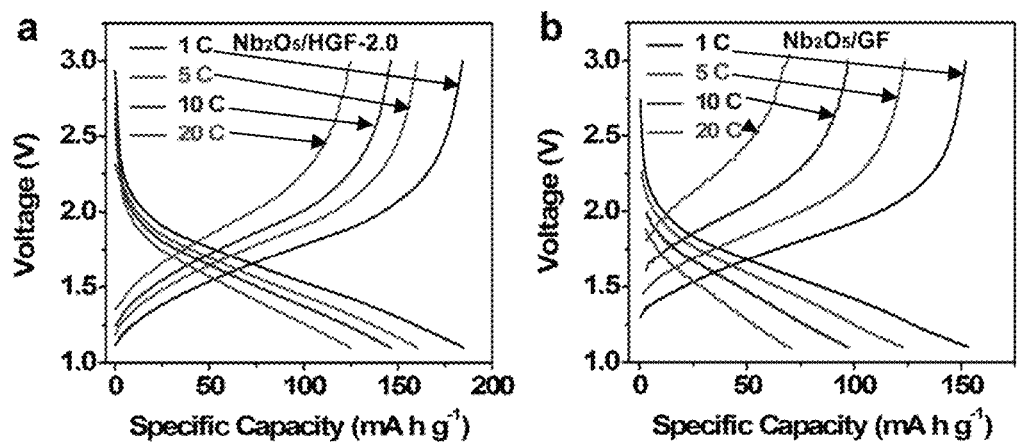

FIG. 14. Galvanostatic charge-discharge curves at different C-rates. a, Nb$_2$O$_5$/HGF-2.0 electrode. b, Nb$_2$O$_5$/GF electrode.

Figure 15:
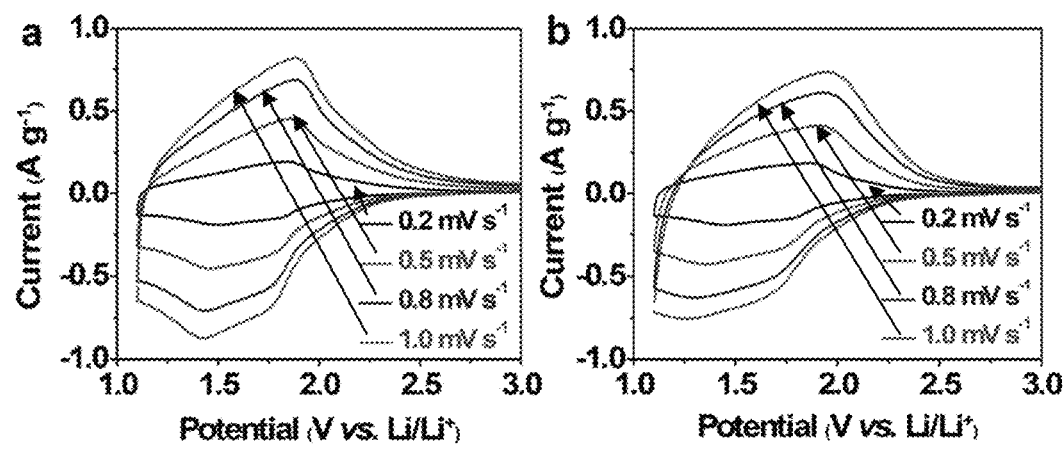

FIG. 15. Cyclic voltammetry curves at various scan rates from about 0.2 to about 1 mV s$^{-1}$. a, Nb$_2$O$_5$/HGF-2.0 electrode. b, Nb$_2$O$_5$/GF electrode. Areal mass loading is about 11 mg cm$^{-2}$.

Figure 16:
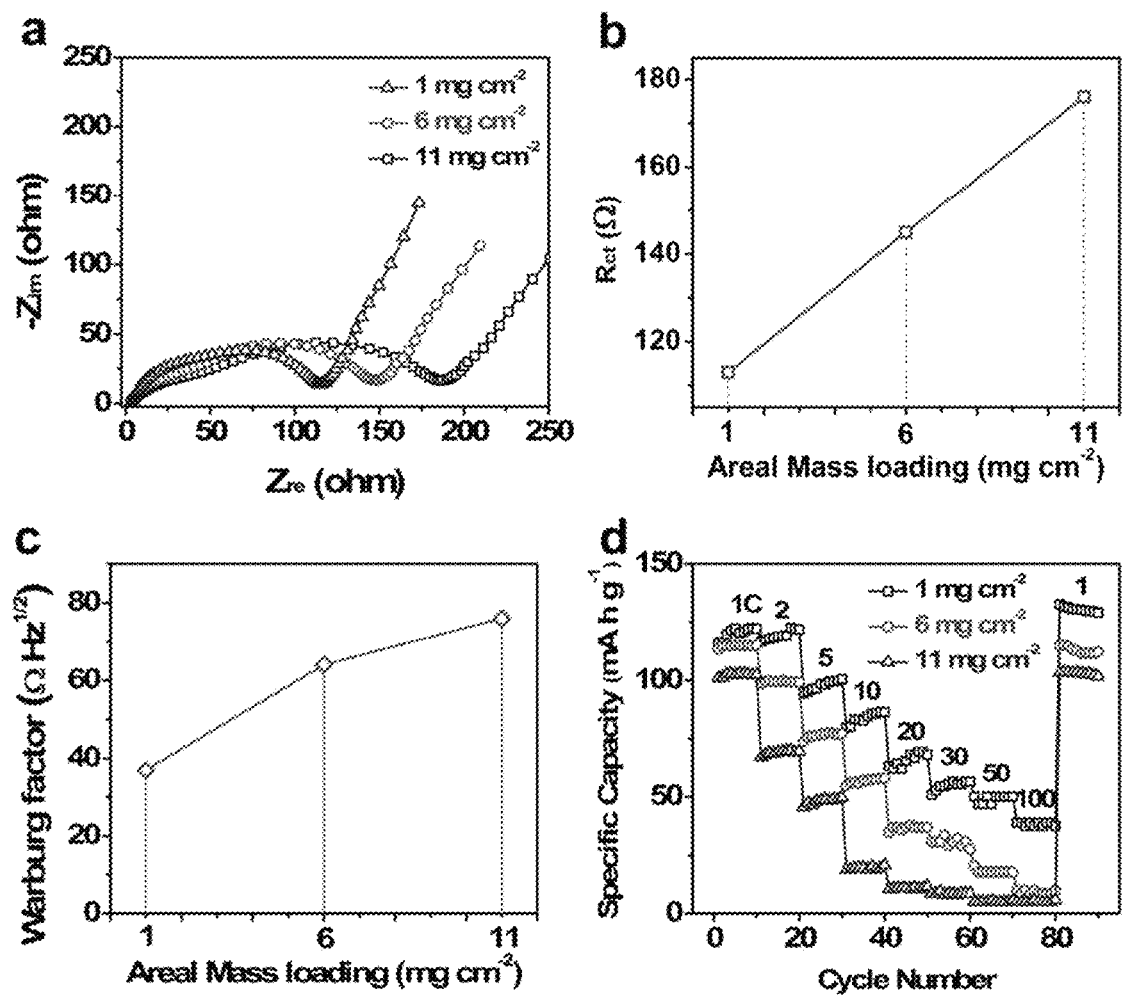

FIG. 16. Areal mass loading dependent electrochemical properties of Nb$_2$O$_5$/C electrodes. a-c, Comparison of Nyquist plots (a), and their corresponding mass loading induced variation of charge transfer resistance (b) and Warburg factor (c) for control electrodes. d, The rate performance (about 1-100 C) at different mass loadings.

Figure 17:
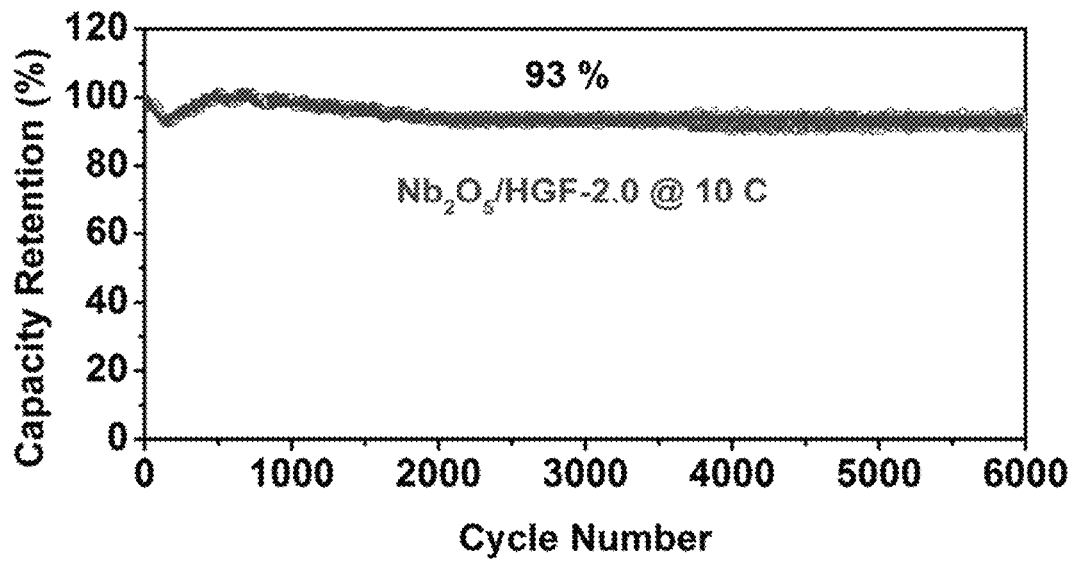

FIG. 17. Long cycling performance of $Nb_2O_5$/HGF-2.0 electrode at about 10 C.

Figure 18:
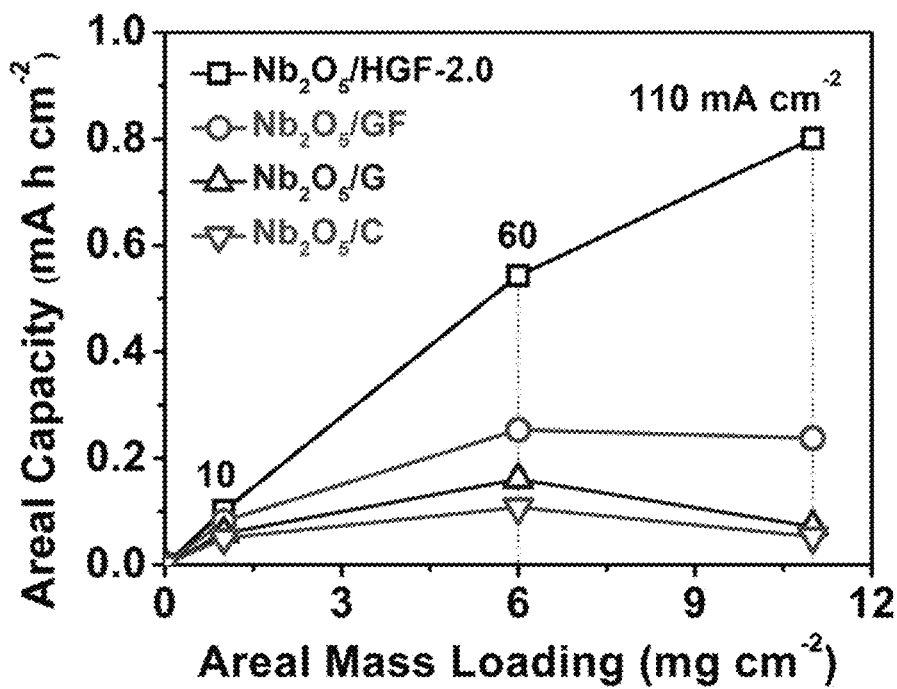

FIG. 18. Comparison of areal capacities as a function of mass loading at a rate of about 50 C.

Figure 19:
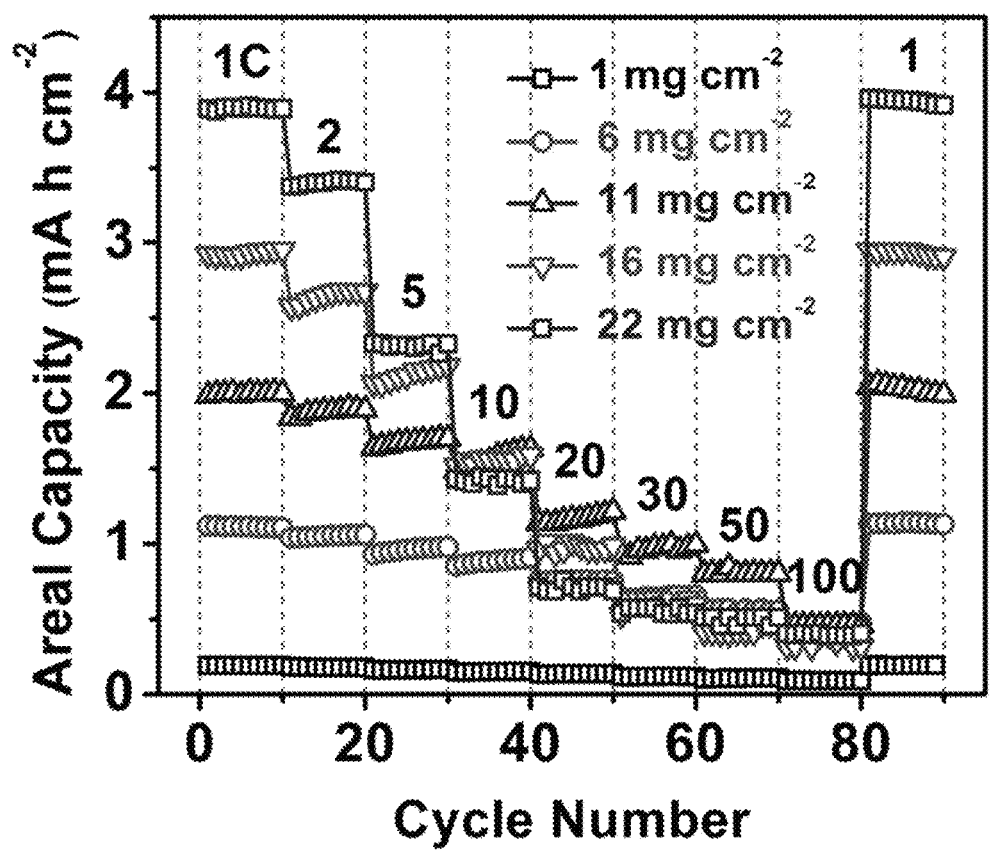

FIG. 19. Comparison of areal capacities of $Nb_2O_5$/HGF electrodes under different rates of about 1-100 C at various mass loadings from about 1 to about 22 mg $cm^{-2}$.

FIG. 20. Table 1—Comparison of performance metrics of energy storage materials.

DETAILED DESCRIPTION

For a practically relevant electrode, increasing a mass fraction of active materials is a way to enhance an overall device performance. In general, an areal mass loading of an active material should be at least higher than that of typical current collectors (about 10-30 thick aluminum or copper foils: about 5-10 mg $cm^{-2}$) and separators (about 1-2 mg $cm^{-2}$). Otherwise, the mass of these electrochemically inactive components dominates the total device mass, rendering the high capacity or high rate capability of the active material of lesser significance. In addition, electrodes with high areal mass loading may decrease the number of layers in a practical electrode stack and thus reduce inactive components (e.g., separators) as well as an assembly time and cost. On the other hand, the high capacity or high rate capability achieved in thinner electrodes with a low mass loading typically cannot be maintained thicker electrodes. The gravimetric capacity or rate capability typical degrades rapidly in a thicker electrode. This is particularly the case for those materials involving ultra-high capacity (e.g., Si) or ultra-high rate capability (e.g., $Nb_2O_5$). Because any given increase in capacity or current density specifies the same amount of increase in charge delivering rate (the more increase in capacity or current density, the higher charge delivery capability is involved), which is a particular challenge beyond the material itself.

In general, to sustain the same or similar gravimetric capacity and current density at higher mass loading electrode (about 10 mg $cm^{-2}$ vs. about 1 mg $cm^{-2}$) involves both much higher effective ion transport rate and higher electron transport rate to deliver about 10 times more charges (ions and electrons) over about 10 times longer distance in a given time. The specified ion transport rate to satisfy the expected high rate in an electrode with practical mass loading (e.g., about 10 mg $cm^{-2}$) should be about 100 times faster than those with a relatively low mass loading (e.g., about 1 mg $cm^{-2}$). Therefore, in a thick electrode, the mass transport limit of ions as well as the resistance for electrons becomes particularly important. Insufficient charge transport could severely degrade the capacity under a fixed charge/discharge window due to considerably higher overpotential. To deliver the promise of electrode materials (e.g., silicon for high capacity and $Nb_2O_5$ for high rate) in practical devices to well exceed current batteries involves unprecedented charge transport rate beyond that of typical electrode constructions, which represents a fundamental challenge in electrode design rather than a straightforward engineering scaling matter.

Niobia ($Nb_2O_5$) is a highly promising anode material with both high capacity (compared to SCs) and ultra-high rate capability. In particular, the orthorhombic $Nb_2O_5$ (T-$Nb_2O_5$) features a crystal structure with empty octahedral sites between (001) planes, which provide natural tunnels throughout the a-b plane with low energy barriers to facilitate rapid ion transport via intercalation pseudo-capacitive mechanism. The charge storage of T-$Nb_2O_5$ therefore is not controlled by semi-infinite diffusion usually seen in other battery materials but surface-controlled kinetics taken place in the bulk of the material to provide unusually high rate capability. However, due to the constrained electron conductivity in T-$Nb_2O_5$, the high rate capability is typically realized in a thin-film electrode (e.g., <about 1 with a mass loading of <about 0.1 mg $cm^{-2}$) and cavity microelectrode with constrained total energy or power output. Despite considerable efforts into nanostructure design and carbon-based hybrids, the high capacity and high rate capability is typically achieved at relatively low mass loading (e.g., about 0.5-4.0 mg $cm^{-2}$), and the overall electrochemical performance typically cannot be maintained as the mass or thickness of electrodes approaches a practical value (e.g., about 4 mg $cm^{-2}$ as the highest reported loading). In a thicker electrode with such high rate material, the overall rate capability is no longer constrained by the ion transport inside the electrode material, but dictated by insufficient ion delivery to the electrode material surface.

Figure 1:
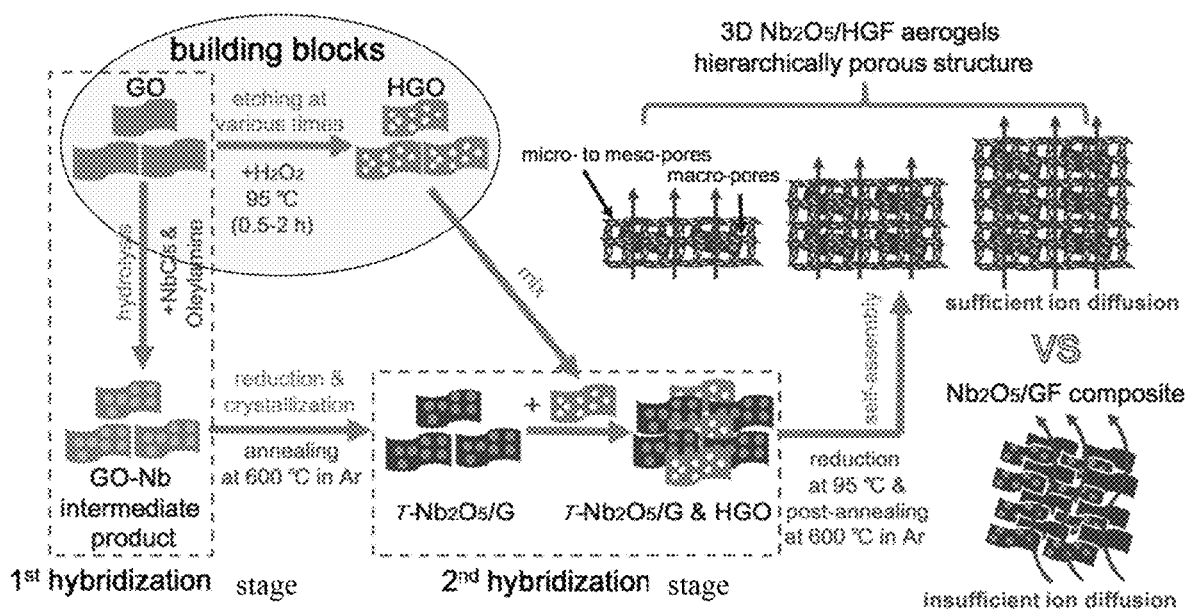
FIG. 1. Schematic illustration of a two-stage process flow to prepare three-dimensional (3D) hierarchically porous composite. $Nb_2O_5$ is first substantially uniformly decorated on a first portion of graphene oxide (GO) (about 4 wt. % of the composite) in stage one, and then with a second portion of GO/holey graphene oxide (HGO) (about 10 wt. % of the composite) followed by a reduction process to produce the monolithic free-standing composite hydrogel. Various HGOs with tailored pores were prepared by etching in $H_2O_2$ for various time durations (0, about 0.5, about 1.0, and about 2.0 hours), and were used to prepare $Nb_2O_5$/pristine graphene framework (GF), $Nb_2O_5$/HGF-0.5, $Nb_2O_5$/HGF-1.0, and $Nb_2O_5$/HGF-2.0 with various degrees of porosity in graphene sheets. The samples were annealed at about 600° C. in argon at the end of each stage in order to produce orthorhombic $Nb_2O_5$ (T-$Nb_2O_5$) and further deoxygenate the reduced GO (RGO) sheets to improve their electronic transport properties. In these composite aerogels, the amount of T-$Nb_2O_5$ is controlled to be about 85 wt. %.

To fully harness the extraordinary rate capability of T-$Nb_2O_5$, it is desired to properly engineer the electrode architecture and ensure exceptional ion transport rate beyond the constraint of the current electrode design while retaining excellent electron transport properties for high capacity and high rate capability. Here some embodiments are directed to a three-dimensional holey graphene framework (3D-HGF) with tunable porosity as a scaffold architecture for T-$Nb_2O_5$ nanoparticles to achieve optimized capacity and ultra-high rate capability even at practical mass loading (>about 10 mg $cm^{-2}$). A two-stage hybridization method is used to prepare free-standing $Nb_2O_5$/HGF composites (substantially free of conductive additives and binders) with a high loading of T-$Nb_2O_5$ active material (e.g., about 85 wt. %) (FIG. 1). The $Nb_2O_5$/HGF composites exhibit a hierarchically porous structure, with larger-sized pores (macropores) in the 3D network and tunable micro- to mesopores in the graphene sheets, which facilitate the rapid mass transport and mitigating diffusion resistance across the entire monolithic structure as well as increasing the ion-accessible surface area to provide high capacity and high rate capability even at high areal mass loading. A systematic investigation demonstrate that a $Nb_2O_5$/HGF composite with tailored nanopores can possess more efficient ion transport capability than other electrodes ($Nb_2O_5$/GF, $Nb_2O_5$/G or $Nb_2O_5$/C) without tailored pores, since the in-plane pores can provide ion transport shortcuts for rapid ion delivery throughout the entire electrode. With the optimized ion transport kinetics, the gravimetric capacity of the $Nb_2O_5$/HGF anode exhibits little degradation with increasing mass loading up to about 22 mg $cm^{-2}$ (@ 1 C), delivering a high gravimetric capacity of about 174 mAh $g^{-1}$, even higher than the capacities achieved in other typical low mass loading (<about 1.5 mg $cm^{-2}$) electrodes (See Table 2). Significantly, with uncompromised performance at high mass loading, the optimized $Nb_2O_5$/HGF electrode delivers an unprecedented areal capacity of about 3.9 mAh $cm^{-2}$ (@ about 22 mg $cm^{-2}$ and about 4.4 mA $cm^{-2}$) and an unprecedented areal current of about 440 mA $cm^{-2}$ (@ about 22 mg $cm^{-2}$ and about 0.4 mAh $cm^{-2}$).

Synthesis and characterization of electrode materials. FIG. 1 schematically illustrates a process flow to prepare free-standing $Nb_2O_5$/HGF composites. The detailed procedure is elaborated in Methods (See Example). Composite aerogels were prepared by hybridizing graphene oxide (GO)

or holey graphene oxide (HGO) with $Nb_2O_5$ precursor in a two-stage process. The first portion of GO (about 4 wt. % of the composite) is mainly used as a physical support for substantially uniform decoration of $Nb_2O_5$ on two-dimensional (2D) GO sheets in stage one, and the second portion of GO/HGO (about 10 wt. % of the composite) is mainly used for the assembly of the monolithic free-standing 3D porous structure in stage two. Various HGOs with tailored pores were prepared by etching in $H_2O_2$ for various time durations from about 0.5 to about 2.0 hours, and used in the second stage. The samples were annealed at about 600° C. in argon at the end of each stage in order to produce orthorhombic $Nb_2O_5$ (T-$Nb_2O_5$) and further deoxygenate the reduced GO (RGO) sheets to improve their electronic transport properties. For various GO/HGO utilized to form the 3D framework, the final composite aerogels are denoted as $Nb_2O_5$/GF for that utilizing pristine graphene framework (GF), and $Nb_2O_5$/HGF-0.5, $Nb_2O_5$/HGF-1.0, and $Nb_2O_5$/HGF-2.0 for those utilizing holey graphene framework (HGF) with tailored pores obtained by etching in $H_2O_2$ for about 0.5, about 1.0 and about 2.0 hours, respectively (Note: more delicate composite aerogels were obtained if using HGO etched for a longer time, e.g., >about 2.0 hours). In these composite aerogels, the amount of T-$Nb_2O_5$ is controlled to be about 85 wt. % (see thermogravimetric analysis (TGA) in FIG. 7), which is higher than that of typically slurry prepared electrodes due to its substantial additive-free feature.

Porosity in the composite electrodes can affect the ion-accessible surface area and improve ion transport kinetics, and thus can play an important role in electrochemical properties. To explore the impact of the porosity in the $Nb_2O_5$/HGF composite electrode, GO or HGO sheets are used with various pores ranging from micro- to mesopores to create the 3D-$Nb_2O_5$/HGF hydrogel composite. The HGO sheets were prepared by etching GO sheets with $H_2O_2$ for various time durations from 0 to about 2.0 hours, in which the oxidative-etching initiates from the chemically active oxygenic defect sites and propagates in the basal plane of GO. As a result, the small carbon vacancies gradually grow into larger pores with increasing etching time. The evolution of these tunable pores on graphene sheets was characterized by high resolution-transmission electron microscopy (HR-TEM) studies, which show increasing pore size with increasing etching time (FIG. 2a-d).

Figure 2:
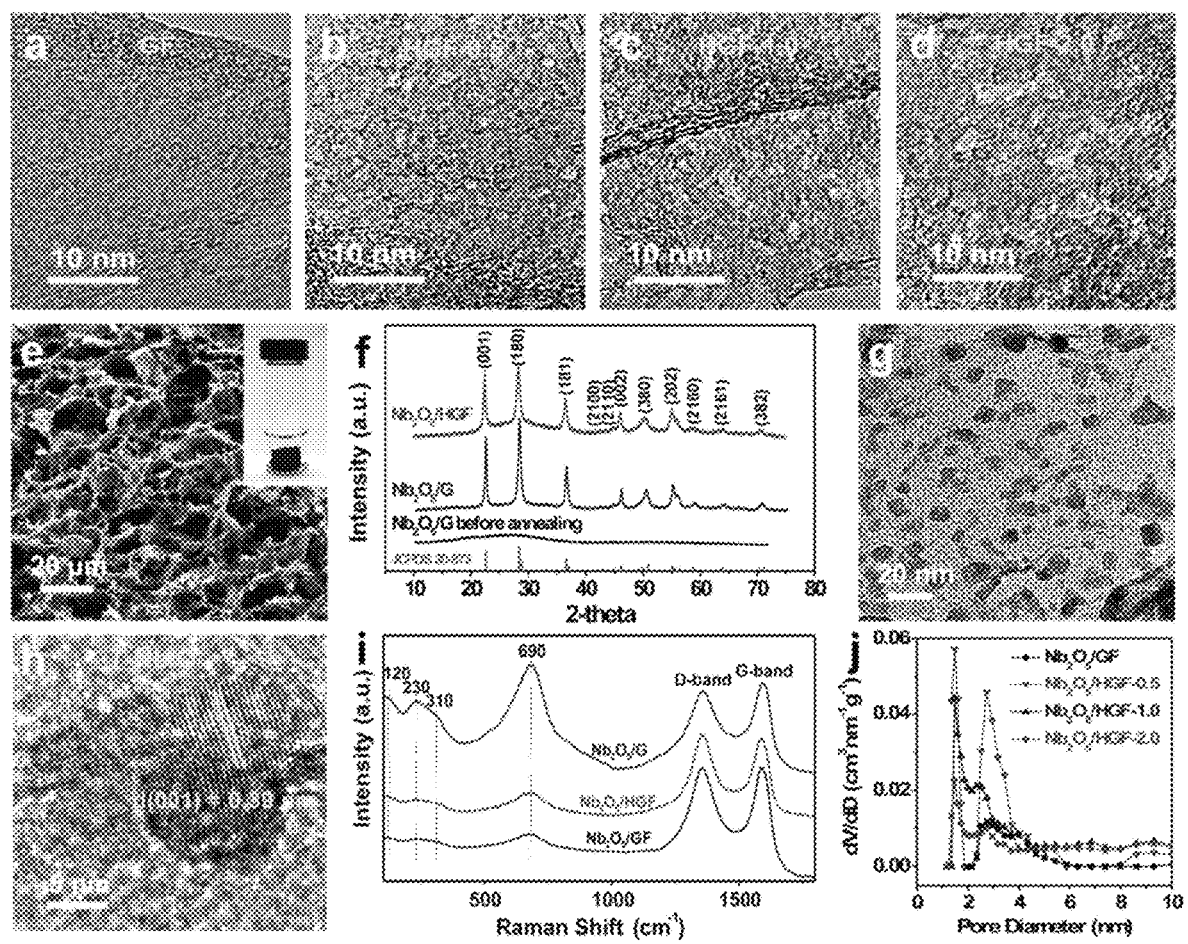
FIG. 2. Material characterization of T-$Nb_2O_5$/HGF composite electrodes. a-d, Transmission electron microscopy (TEM) images of graphene sheets with tailored pores obtained by etching in $H_2O_2$ for 0, about 0.5, about 1.0 and about 2.0 hours, respectively. e, Cross-sectional scanning electron microscopy (SEM) image of $Nb_2O_5$/HGF composite shows 3D hierarchical porous structure. The inset shows a freestanding monolithic hydrogel used to make the electrode. f, X-ray diffraction (XRD) patterns of as-synthesized $Nb_2O_5$/G powders before and after about 600° C. annealing, and freestanding $Nb_2O_5$/HGF composite. The amorphous phase is effectively converted into orthorhombic phase that is desired for high rate lithium insertion. g, TEM image of graphene sheets with substantially uniformly decorated T-$Nb_2O_5$ nanoparticles with a particle size of about 10-15 nm. h, High resolution-TEM (HR-TEM) image of T-$Nb_2O_5$ with lattice spacing of about 0.39 nm for the (001) plane of the orthorhombic phase. i, Raman spectra of $Nb_2O_5$/G powder after thermal annealing, and freestanding $Nb_2O_5$/GF and $Nb_2O_5$/HGF electrodes. The D and G bands are characteristic of RGO; the Raman bands at about 120, about 230, about 310 and about 690 $cm^{-1}$ further confirm the orthorhombic phase of T-$Nb_2O_5$. j, Comparison of density functional theory (DFT) pore size distributions. The prominent pore size shifts from micropores (e.g., about 1.5 nm) to mesopores (e.g., about 2.7 nm) for the composite prepared from HGO with increasing etching time.

After the second hybridization stage, a freestanding monolithic hydrogel is obtained (FIG. 2e, inset). Scanning electron microscopy (SEM) studies show the 3D porous structure (FIG. 2e). The as-synthesized $Nb_2O_5$ on GO is amorphous, and can be effectively converted into orthorhombic phase of T-$Nb_2O_5$ (JCPDS 30-873) after about 600° C. annealing in argon, as demonstrated by the X-ray diffraction (XRD) studies (FIG. 2f). The crystal size of T-$Nb_2O_5$ is about 15-20 nm as determined by the Debye-Scherrer formula based on XRD peak width. The graphene in the composites is hardly recognizable in the XRD patterns (about 26 deg.) due to low mass ratio and few stacked graphene sheets. The transmission electron microscopy (TEM) image (FIG. 2g) further confirms that T-$Nb_2O_5$ nanoparticles are substantially homogeneously decorated on the graphene sheets with a size of about 10-15 nm, consistent with those derived from the XRD studies. The HR-TEM image shows clearly resolved lattices spacing of about 0.39 nm, consistent with the (001) plane of orthorhombic phase (FIG. 2h). Raman spectroscopic studies show characteristic D and G bands of RGO in the composites (FIG. 2i). Additionally, the Raman bands at about 120, about 230, about 310 and about 690 $cm^{-1}$ further confirm the orthorhombic phase T-$Nb_2O_5$. Furthermore, the Brunauer-Emmett-Teller (BET) measurement and density functional theory (DFT) analysis can give the average pore size distributions in the 3D $Nb_2O_5$/HGF composites (FIG. 2j), where the prominent pore size shifts from micropores (e.g., about 1.5 nm) to mesopores (e.g., about 2.7 nm) for $Nb_2O_5$/HGF composites prepared from HGO with increasing etching time, which is consistent with the corresponding HR-TEM studies (FIG. 2a-d). In addition, the BET studies demonstrate an increasing trend for specific surface area (from about 65 $m^2$ $g^{-1}$ to about 83 $m^2$ $g^{-1}$ normalized by the total mass of the composite as the etching time evolved from 0 to about 2.0 hours).

It should be noted that the two-stage hybridization approach, with about 600° C. annealing in argon after each stage, allows preparation of the mechanically strong 3D hydrogel with high mass loading of $Nb_2O_5$ nanoparticles and sufficient electrical conductivity for high power performance. Other synthesis methods, for example, two-stage hybridization method without annealing after first hybridization stage (see Method 2 in FIG. 8b) and one-stage hybridization method (see Method 3 in FIG. 8c) were also explored for the comparison. For the one-stage method, the composite hydrogel can be obtained when the mass ratio of the metal oxide is <about 65% (see samples No. 3-5 in FIG. 9a). SEM studies also show that the composite aerogel obtained from the two-stage method shows more open 3D porous structure (FIG. 2a and FIG. 9b) when compared with that (FIG. 9c) obtained from the two-stage method without annealing after initial hybridization, and that (FIG. 9d) obtained from the one-stage method.

Together, there are some notable features of the two-stage hybridization method compared to other hybridization methods: (1) it can readily allow the incorporation of high mass loading of active materials (e.g., about 85 wt. %) while maintaining mechanically strong 3D porous structure; (2) with the two-stage annealing treatment, it can mitigate against possible damages of the 3D graphene framework by the crystallization process of metal oxides; (3) it decouples the active material loading stage from the 3D conjugation stage, and thus allow broader flexibility to synthesize various structures in stage one with much less negative impact on the formation of 3D graphene network in stage two. Those features render the two-stage method a general strategy for synthesis of freestanding graphene based composites with robust hierarchical porous structures and high loading of active materials, which can provide favorable pathways to facilitate the transport of both electrons and ions in the composite aerogels even at practical areal mass loading (>about 10 mg $cm^{-2}$).

Figure 3:
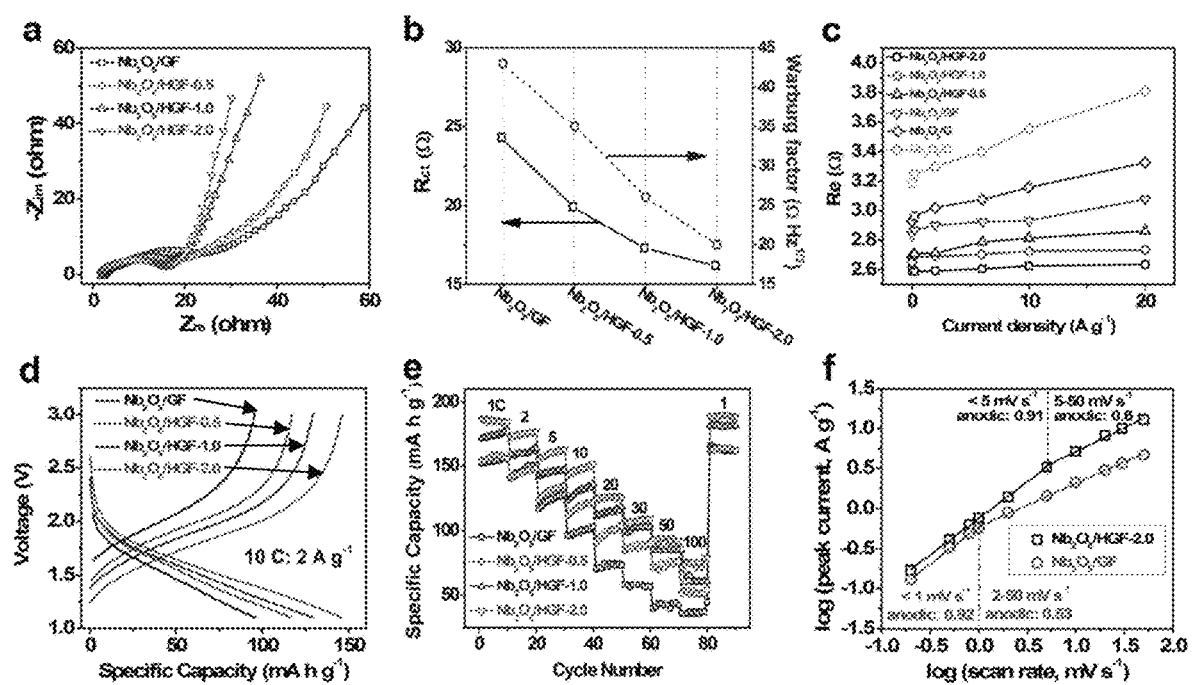
FIG. 3. Evolution of kinetic properties and electrochemical characteristics with porosity. a, b, Comparison of Nyquist plots obtained from potentiostatic electrochemical impedance spectroscopy (EIS) at open-circuit potential (a), corresponding charge transfer resistance ($R_{ct}$) and Warburg factor (σ, the slope of Zw vs. $\omega^{-1/2}$) as a function of the porosity of electrode materials (b). With increasing porosity, charge transport kinetics is substantially improved according to the gradually decreased Warburg factor and charge transfer resistance. c, The comparison of Ohmic resistance acquired from galvanostatic EIS at potential of about 1.1 V upon various charging current densities from about 0.2 to about 20 A $g^{-1}$. The 3D electrode with porous structure shows much less increase of Ohmic resistance than other electrodes. d, Galvanostatic charge-discharge curves of various electrodes with tunable nanopores at a rate of about 10 C (about 2 A $g^{-1}$) in the voltage window of about 1.1-3.0 V (vs Li/Li$^+$). The charge-discharge curves of $Nb_2O_5$/HGF-2.0 electrode with nanopores show improved capacity and reduced internal resistance as indicated by the smaller slope and smaller voltage drop. e, Comparison of specific capacities at various rates (about 1-100 C) for 3D composite electrodes with tunable pores. All the electrochemical properties were normalized by the total weight of the freestanding electrode with an areal mass loading of about 6 mg $cm^{-2}$. f, Comparison of anodic peak current at various scan rates from about 0.2 to about 50 mV $s^{-1}$ between $Nb_2O_5$/HGF-2.0 and $Nb_2O_5$/GF electrodes. A quasi-linear correlation for $Nb_2O_5$/HGF-2.0 electrode with power factor closer to 1

Tuning electrochemical properties by porosity. The ability to systematically tailor the pore size in the graphene sheets can readily allow tuning the ion transport and the electrochemical properties of the resulting $Nb_2O_5$/HGF composites. To gain insight into the correlation between the structure characteristics and their corresponding charge transport kinetics, potentiostatic electrochemical impedance spectroscopy (EIS) measurements are performed on the composites with tunable in-plane nanopores at open-circuit potential. The Nyquist plots show a single semicircle in the high-medium frequencies and a sloping line in the low frequencies for all the electrodes (FIG. 3a). The intercept with the real axis at high frequencies is the Ohmic resistance (Re) originating from electron contact resistance, electrical resistance of the electrode, and electrolyte resistance, which is rather low (about 1.8-2.1Ω) and further validated by the modified Randles equivalent circuit analysis (FIG. 10 and Table 3). Here the Ohmic resistance is primarily resulting from the electrolyte resistance, and the resistance from other components (e.g., electrode, coin cell components and contact) should be comparably negligible. Meanwhile, the gradually decreased diameters of the semicircle at medium to high frequency range (FIG. 3a) represent the reduction of the charge transfer resistance ($R_{ct}$) from about 25 to about 16Ω with increasing pores in the HGF (FIG. 3b and Table 3). The low Ohmic resistance and gradually reduced charge-transfer resistance can be largely attributed to the excellent electron transport provided by the highly interconnected graphene network and the favorable ion transport kinetics facilitated by the highly continuous porous channels throughout the entire monolithic electrodes, which is difficult to achieve in typical slurry based electrodes (see details of the comparison in next section). The continuously increasing slope at low frequency range with increasing pore size is an indication of substantially improved diffusion kinetics by tailoring the in-plane pores, which is validated by the Warburg impedance (Zw) analysis (FIG. 10). To further investigate the improved diffusion capability, Warburg factor ($\sigma$) is derived from the slope of Warburg impedance vs. $\omega^{-1/2}$ ($\omega$: angular frequency) at the diffusion-controlled region. The Warburg factor is significantly decreased (about 43 vs. about 20 $\Omega Hz^{1/2}$) with increasing pore size in the holey graphene sheets (FIG. 3b and Table 3), indicating a substantially improved ion transport capability. It should be noted that this diffusion resistance is originated from the ion diffusion in both solid state $Nb_2O_5$ nanoparticles and electrolyte within the hierarchically porous structure. Because of substantially constant diffusion coefficient in $Nb_2O_5$ nanoparticles, the improved ion diffusion characteristics are primarily resulting from the optimized porous structure to facilitate ion diffusion and ion delivery to the $Nb_2O_5$ nanoparticles throughout the entire electrode. Together, the above studies demonstrate that the ion transport kinetics can be considerably improved by tailoring the pore size in the holey graphene sheets that form the 3D graphene scaffold. In particular, the in-plane pores can function as the ion transport shortcuts in the hierarchical porous structure to greatly speed up the ion transport throughout the entire 3D electrode and facilitate ion access to the surface of active materials (T-$Nb_2O_5$).

In order to evaluate the ion transport kinetics under working condition, galvanostatic EIS measurements are performed on the electrodes at various charging/discharging current densities at the potential of about 1.1 or about 2.5 V (FIG. 3c and FIG. 11). The 3D porous electrode with nanopores ($Nb_2O_5$/HGF-2.0) shows a nearly constant Ohmic resistance (electrolyte resistance) at either about 2.5 or about 1.1 V with increasing current density from about 0.2 to about 20 A $g^{-1}$, demonstrating a true Ohmic behavior of the electrolyte resistance and a nearly uncompromised ion transport capability at high charge/discharge rate. In contrast, the Ohmic resistance (electrolyte resistance) measured in other control electrodes without tailored pores ($Nb_2O_5$/GF: $Nb_2O_5$ nanoparticles loaded on GF without in-plane pores; $Nb_2O_5$/G and $Nb_2O_5$/C: $Nb_2O_5$ nanoparticles and graphene or amorphous carbon) show higher Ohmic resistance with increasing current density, indicating non-Ohmic behavior and compromised ion transport properties at high current density, which is likely attributed to considerably slowed ion transport in the electrode due to a current crowding effect (FIG. 12) at high charge/discharge current. These studies highlight that $Nb_2O_5$/HGF with tailored pores as the ion transport shortcuts is desired for maintaining the ion transport kinetics and true Ohmic behavior for sustained performance at high rate. It should also be noted that EIS studies primarily measure the ion transport in short distance under an alternating current (AC) perturbation, which is distinct from the charge/discharge process that involves long-range ion transport across the entire electrode thickness under a direct current (DC). The difference between the electrodes with and without tailored pores can be even greater under charge/discharge process in which the ions have to traverse the entire electrode thickness.

In galvanostatic charge/discharge curves at rates of about 1 and about 5 C (1 C: 0.2 Ah $g^{-1}$) (FIG. 13), and about 10 C (FIG. 3d), $Nb_2O_5$/HGF-2.0 electrode with nanopores shows improved capacity and reduced internal resistance, as indicated by the smaller voltage drop and smaller slope. All charge-discharge curves show a relatively high cut-off voltage (about 1.1 V) that is characteristic of $Nb_2O_5$/HGF electrode. The high cut-off voltage may offer advantages such as the prevention of the formation of excess solid electrolyte interphase (SEI) at low potential, and reduction of the surface film resistance outside the electrode materials, thus facilitating fast mass transport.

Further validation of the optimized transport kinetics was performed by comparing the rate performance (about 1-100 C) of 3D composite electrodes with tunable in-plane nanopores at relatively high mass loading of about 6 mg $cm^{-2}$ (FIG. 3e and FIG. 14). Consistent with the evolution of electron and ion transport kinetics, the $Nb_2O_5$/HGF-2.0 electrode shows superior rate-capability to other counterpart electrodes due to its optimal pore size. As a result, it can deliver much higher specific capacity of about 185 mAh $g^{-1}$ at about 1 C compared to that of $Nb_2O_5$/GF without tailored nanopores (about 153 mAh $g^{-1}$), and this enhancement becomes more pronounced at the elevated C-rate. At a high rate of about 10 C, the $Nb_2O_5$/HGF-2.0 electrode delivers a specific capacity of about 147 mAh $g^{-1}$ with about 79% capacity retention compared to that at about 1 C, in contrast to about 100 mAh $g^{-1}$ with about 63% capacity retention for the $Nb_2O_5$/GF electrode. At even higher rate of about 100 C, the $Nb_2O_5$/HGF-2.0 electrode delivers a specific capacity of about 76 mAh $g^{-1}$, which is more than twofold higher than that in $Nb_2O_5$/GF electrode (about 35 mAh $g^{-1}$). With the substantial additive-free feature, the 3D composite electrode at high mass loading of about 6 mg $cm^{-2}$ can deliver at least about 27-85% improvement of capacities compared to other $Nb_2O_5$ based electrodes at low mass loading (about 0.4-2.0 mg $cm^{-2}$), when normalized by the total mass of the electrode materials ($Nb_2O_5$, graphene, conductive additive or binder) (Table 2). This difference would be even higher when the mass of the current collectors were included in practical devices (See section below).

The exceptional high rate capability of T-$Nb_2O_5$ electrode has been demonstrated in thin-film electrode and cavity microelectrode due to its fast kinetic response via intercalation pseudo-capacitive mechanism, but with constrained total energy or power output due to the low mass loading and ultra-thin electrodes used. Importantly, with the design of the hierarchically porous architecture, the $Nb_2O_5$/HGF-2.0 composite electrodes can maintain their fast intrinsic kinetics even at practical mass loading. In particular, the cyclic voltammetry (CV) test of the $Nb_2O_5$/HGF-2.0 electrode (@ about 11 mg $cm^{-2}$) (FIG. 15a) shows that there is no noticeable anodic/cathodic peak shift as the scan rate is increased from about 0.2 to about 1.0 mV $s^{-1}$, in contrast to noticeable peak shift for the $Nb_2O_5$/GF electrode (FIG. 15b). In principle, the $Nb_2O_5$ nanoparticles in $Nb_2O_5$/HGF-2.0 and $Nb_2O_5$/GF electrodes are the same and different charge intercalation kinetics would not be expected. The presence of noticeable peak shift in $Nb_2O_5$/GF electrode with increasing scan rate thus indicates that additional electrode polarization observed in $Nb_2O_5$/GF can be attributed to insufficient ion delivery to the $Nb_2O_5$ nanoparticle surface. The absence of such peak shift in $Nb_2O_5$/HGF-2.0 indicates enhanced kinetics due to its hierarchically porous structure with tailored nanopores for efficient ion transport even at high scan rate.

Further analysis show that the currents in the CV tests are directly proportional to the scan rates, obeying the power law:

$$i = av^b \tag{1}$$

where a and b are adjustable parameters, i is the current, and v is the scan rate. It manifests a quasi-linear correlation with power factor closer to 1 (b=0.91) for $Nb_2O_5$/HGF-2.0 electrode as the scan rate increased from about 0.2 to about 5 mV (FIG. 3f); thus the fast surface-controlled mechanism is dominated, and the power factor of about 0.6 for scan rates from about 5 to about 50 mV s$^{-1}$ indicates the mechanism between surface controlled and semi-infinite controlled diffusion. While for $Nb_2O_5$/GF electrode, the fast surface-controlled mechanism (b=0.92) can be maintained at scan rate lower than about 1.0 mV s$^{-1}$, and beyond that, the semi-infinite linear diffusion is dominated (b=0.52). Such comparison directly demonstrates that the $Nb_2O_5$/HGF-2.0 electrode exhibits superior mass transport kinetics compared to $Nb_2O_5$/GF electrode. Again, since $Nb_2O_5$ nanoparticles are the same, the observed difference here is more likely attributed to the ion transport outside the $Nb_2O_5$ nanoparticles (ion transport in the GF or HGF and delivery to the surface of $Nb_2O_5$) rather than inside the $Nb_2O_5$ nanoparticles. Together, these studies further demonstrate that HGF with optimized in-plane pores is desired for electrolyte transport throughout the entire electrode for the full utilization of the active materials and realization of pseudocapacitive-like properties at practical mass loading.

Mass loading dependent performance. Although other studies have reported excellent gravimetric performance, these performance metrics are typically achieved at rather low mass loading (e.g., about 1 mg cm$^{-2}$) and cannot be scaled up linearly with mass/thickness of the electrodes due to rapidly degrading charge (electron and ion) transport characteristics with increasing electrode mass/thickness. As demonstrated in the control electrode $Nb_2O_5$/G with random graphene network (lower panel in FIG. 4a) and $Nb_2O_5$/C with amorphous carbon additives (FIG. 16a), their kinetic losses are severe with increasing mass loading from about 1 to about 11 mg cm$^{-2}$. Specifically, both the charge transfer resistance and the Warburg factor increased almost by twofold, indicating a rapidly degrading electron and ion transport kinetics (FIG. 4b,c and Table 4), which can be largely attributed to insufficient electrolyte transport across longer distance within thicker electrodes. The charge-discharge curves of $Nb_2O_5$/G control electrode at about 10 C show an increasingly steeper slope and larger voltage drop with increasing mass loading (FIG. 4e), indicating an increasingly larger internal resistance, which may cause increasing overpotentials with increasing mass loading, leading to rapidly degrading capacities. As a result, as the mass loading in $Nb_2O_5$/G electrode increases from about 1 to about 11 mg cm$^{-2}$, about 30% and about 11% of the capacity can be maintained at about 10 C (FIG. 4g) and about 50 C (FIG. 4h), respectively. Such rapidly degrading performance with increasing mass loading highlights the extreme challenges in satisfying the much higher areal ion-current density to maintain the same gravimetric performance in thicker electrodes. When electrode materials in the upper layer of the electrode are intercalated with more lithium than the underlying layers, the incoming ions have to travel a longer distance deeper into the electrode. Thus, the ion transport challenge becomes more pronounced for electrodes with high mass loading (e.g., >about 10 mg cm$^{-2}$) where the overall areal current density could be about 10 times as high as for the low mass electrode (e.g., about 1 mg cm$^{-2}$) and the ion travel distance is over about 10 times longer.

Nevertheless, by optimizing the hierarchically porous HGF with tailored nanopores, the mass-loading induced kinetic losses have been greatly mitigated (upper panel in FIG. 4a, and FIG. 4b,c). For example, the charge transfer resistance of the $Nb_2O_5$/HGF-2.0 electrode (@ about 11 mg cm$^{-2}$) is about one fourth of that of $Nb_2O_5$/G control electrode (about 18 vs. about 82Ω), and nearly one order of magnitude lower than that of $Nb_2O_5$/C electrode (about 18 vs. about 176Ω), which indicates a substantial increase of charge kinetics in the 3D monolithic composite electrode. Furthermore, the $Nb_2O_5$/HGF-2.0 electrode shows considerably smaller Warburg factor than the control electrodes (@ about 11 mg cm$^{-2}$), which indicates a significant enhancement of ion transport property across the tailored shortcut channels in the hierarchically porous structure. Additionally, the charge-discharge curves of the tailored $Nb_2O_5$/HGF-2.0 electrode shows relatively small voltage drop and capacity degradation, and no apparent changes of slope and voltage drop with increasing mass loading (FIG. 4d), indicating a low internal resistance. As a result, a high capacity of about 140 mAh g$^{-1}$ (about 95%, @ about 11 mg cm$^{-2}$) can be maintained at a high rate of about 10 C, with about 5% capacity loses compared to that at low mass loading (@ about 1 mg cm$^{-2}$) (FIG. 4g). At an extremely high rate of about 50 C, about 72% of the capacity can be retained compared to low mass electrode (FIG. 4h). In contrast for the $Nb_2O_5$/G control electrode (@ about 11 mg cm$^{-2}$), about 30% and about 11% of the capacity can be retained at about 10 C and about 50 C, respectively. This unprecedented performance in the $Nb_2O_5$/HGF-2.0 electrode is mainly attributed to its hierarchically porous structure with tailored nanopores for forming highly interconnected channels for rapid ion transport throughout the entire electrode to reach $Nb_2O_5$ active sites for rapid charge storage, contributing to the improved capacity and high rate capability. Taking the packing density (about 2.2 g cm$^{-3}$) of the composite electrode into consideration, the volumetric capacity and current density based on the whole electrode volume were determined to be about 407 mAh cm$^{-3}$ and about 44 A cm$^{-3}$. In addition, the $Nb_2O_5$/HGF-2.0 electrode can also deliver stable and long-lived cycling performance with high capacity retention of about 93% after 6000 cycles (FIG. 17), attributed to its robust porous structure and enhanced charge transport kinetics.

Merits of high mass loading electrodes. In general, for typical battery or supercapacitor assemblies, the overhead from the current collectors and separators is dictated by the areal capacity of the electrode. The increase in the areal capacity is one pathway to higher cell level energy density and lower cost. Therefore, for practical applications, the areal performance is particularly important for proper evaluation of true performance metrics of an energy storage system. In this regard, the merit of the $Nb_2O_5$/HGF-2.0 electrode is noted. With the 3D hierarchical porous structure in the $Nb_2O_5$/HGF-2.0 electrode for highly efficient ion transport, the areal capacity increases nearly linearly with the mass loading (@ about 10 C in FIG. 5a). In contrast, the control electrodes $Nb_2O_5$/GF, $Nb_2O_5$/G and $Nb_2O_5$/C all deliver substantially lower areal capacity at the same mass loading, and do not show a linear scaling relation with mass loading (FIG. 5a and FIG. 18). In particular, for the $Nb_2O_5$/G and $Nb_2O_5$/C electrode, it is evident that the areal capacity even decreases with increasing mass loading, indicating additional electrode material could not contribute to additional capacity for energy storage, but slows the charge transport characteristics to seriously degrade the overall capacity. This further highlights that it is desired to tailor the electrode architecture for efficient charge delivery in order to translate the fundamental performance of electrode material into practical device performance.

Niobia can be used for a high-rate electrode in thin film devices. Further evaluation is conducted on the performance of the $Nb_2O_5$/HGF-2.0 electrode at various charging/discharging rates. FIG. 5b demonstrates the correlation of areal capacity with mass loading at various C-rates. For example, the areal capacity is linearly proportional to the mass loading up to about 22 mg cm$^{-2}$ at about 1 C, while at a high rate of about 10 C, the areal capacity begins to level off as the mass loading exceeds about 11 mg cm$^{-2}$, and at a rate higher than about 50 C, it begins to level off at a relatively low mass loading of about 6 mg cm$^{-2}$. These results show that, as the C-rate increases, a further increase of mass does not result in proportionally higher capacity due to insufficient ion transport rate to deliver ions in the thicker electrode within the requisite time.

FIG. 5c further shows the areal performance metrics for the $Nb_2O_5$/HGF-2.0 electrode with different mass loadings. A maximum areal capacity of about 3.9 mAh cm$^{-2}$ is achieved at a current density of about 4.4 mA cm$^{-2}$ (@ mass loading of about 22 mg cm$^{-2}$), and a maximum areal current density reaches up to about 440 mA cm$^{-2}$ (@ mass loading of about 22 mg cm$^{-2}$) (FIG. 5c and FIG. 19). As demonstrated in FIG. 5c, the capacity for each electrode with various mass loadings is maintained until a threshold current density is reached. The decrease in the capacity indicates the onset of charge transport constraint. The different electrode mass loadings show different threshold current densities, indicating that the mass transport within the electrolyte (electrolyte transport) in the 3D HGF is the primary constraining factor rather than the solid state diffusion transport within the intercalation T-$Nb_2O_5$ materials. According to the correlation of capacity, mass loading and current density, it may indicate the optimal mass loading for proper current density for various applications. For a portable electronic device that specifies medium power (e.g., about 1 C), a higher mass loading (e.g., >about 22 mg cm$^{-2}$) is more favorable for increasing the energy capacity and lowering the cost. While for applications that specify a high rate (e.g., about 50 C), relatively low mass loading (e.g., <about 11 mg cm$^{-2}$) is more appropriate to access the full capacity at a high rate.

The merit of an electrode with a high mass loading becomes more apparent when the mass of inactive components (e.g., current collectors: about 10 mg cm$^{-2}$) is taken into account. As demonstrated in FIG. 5d, for an electrode with a high mass loading of about 11 mg cm$^{-2}$, both the specific capacity and current density will be reduced by about twofold if considering the mass of a current collector (about 10 mg cm$^{-2}$), while for an electrode with a low mass loading of about 1 mg cm$^{-2}$, the corresponding performance will be reduced by about 11 times. In this case, even though high performance can be achieved in a low mass loading device, the performance of the active material is of reduced relevance for practical devices if the mass of the electrochemically inactive components dominate the total electrode mass (Table 1 in FIG. 20). It is important to note that the above analysis considers the overhead from current collectors. Similarly, the overhead from separators or package can further highlight the importance of high mass loading for practical devices.

Comparing with other $Nb_2O_5$ based anodes (about 0.4-2.0 mg cm$^{-2}$) (Tables 1 and 2), the projected gravimetric capacities of the $Nb_2O_5$/HGF-2.0 electrode at practical mass loading (>about 10 mg cm$^{-2}$) exhibit about 4-10 fold improvement if the mass of the current collector is taken into consideration, while the areal current output is about one order of magnitude higher. Comparing with high capacity silicon anodes (e.g., Si anodes at low mass loading of about 0.2 mg cm$^{-2}$ in Table 1), the $Nb_2O_5$/HGF-2.0 anodes deliver a comparable projected gravimetric capacities and about 10-200 times higher gravimetric current density when the mass of the current collector is taken into account.

Conclusion. A two-stage hybridization method is disclosed to form a holey graphene framework (HGF) with a hierarchical porous structure as a conductive scaffold for niobia ($Nb_2O_5$) to simultaneously ensure excellent ion and electron transport properties and provide high capacity and high rate capability. By systematically tailoring the porosity in the holey graphene backbone, charge transfer and mass transport in the $Nb_2O_5$/HGF composite electrode can be optimized to deliver excellent electrochemical performance at practical mass loading (>about 10 mg cm$^{-2}$), with an unprecedented combination of areal capacity and current density. In particular, the highest achieved areal current density (e.g., about 440 mA cm$^{-2}$) is over about 1-2 orders of magnitude higher than other electrode designs. The achievement of high capacity and high rate capability at high mass loading opens a path towards practical devices with sustained performance metrics.

EXAMPLE EMBODIMENTS

More generally, some embodiments of this disclosure are directed to a method of forming a composite, which includes: (1) loading an electrochemically active material onto graphene sheets to form electrochemically active material-loaded graphene sheets; (2) combining the electrochemically active material-loaded graphene sheets with holey graphene oxide sheets to form a mixture; and (3) treating the mixture under reducing conditions to form a composite including a graphene framework loaded with, or conjugated with, the electrochemically active material.

In some embodiments, the electrochemically active material is a nanoscale electrochemically active anode material (e.g., nanostructures formed of silicon (Si), tin (Sn), germanium (Ge), antimony (Sb), a metal oxide, such as a transition metal oxide like iron oxide (e.g., $Fe_3O_4$) or niobia or a post-transition metal oxide like tin oxide (e.g., $SnO_x$), or another active material for the construction of high energy and high power density anodes). In some embodiments, the electrochemically active material is a nanoscale electrochemically active cathode material (e.g., nanostructures formed of sulfur (S), phosphorus (P), lithium cobalt oxide such as $LiCoO_2$, lithium manganese oxide such as $LiMn_2O_4$ or $LiMnO_4$, lithium nickel manganese cobalt oxide, lithium iron phosphate such as $LiFePO_4$, lithium nickel cobalt aluminum oxide, lithium titanate, lithium oxide such as $LiO_2$ or $Li_2O_2$, or another active material for the construction of high energy and high power density cathodes). Nanostructures of the electrochemically active material can have at least one dimension or extent in a range of about 1 nm to about 200 nm, about 1 nm to about 180 nm, about 1 nm to about 160 nm, about 1 nm to about 140 nm, about 1 nm to about 120 nm, about 1 nm to about 100 nm, about 1 nm to about 80 nm, about 1 nm to about 60 nm, about 1 nm to about 40 nm, or about 1 nm to about 20 nm. Other embodiments can be implemented by loading a pseudo-capacitive material or a catalyst.

In some embodiments, loading in (1) includes: (1a) loading a precursor of the electrochemically active material onto graphene oxide sheets to form precursor-loaded graphene oxide sheets; and (1b) treating the precursor-loaded graphene oxide sheets under reducing conditions to form the electrochemically active material-loaded graphene sheets. In some embodiments, treating in (1b) includes heating at a temperature in a range of, for example, about 400° C. to about 800° C., about 450° C. to about 750° C., about 500° C. to about 700° C., about 550° C. to about 650° C., or about 600° C. for a time interval in a range of, for example, about 0.5 h to about 10 h, about 0.5 h to about 8 h, about 1 h to about 6 h, about 2 h to about 4 h, or about 3 h in an inert environment. In some embodiments, treating in (1b) is performed in the presence of a structure-directing agent, such as an amine like oleylamine or another unsaturated fatty amine, to promote a desired morphology of nanostructures of the electrochemically active material.

In some embodiments, the holey graphene oxide sheets have basal-plane or in-plane nanopores formed in the holey graphene oxide sheets, and the nanopores can have sizes (or a peak size or an average size) in a range, for example, from about 1 nm, from about 2 nm, from about 3 nm, from about 4 nm, or from about 5 nm, and up to about 10 nm, up to about 20 nm, up to about 50 nm, up to about 100 nm, or more. For example, the basal-plane nanopores can have sizes (or a peak size or an average size) from about 1 nm to about 100 nm, from about 1 nm to about 50 nm, from about 1 nm to about 20 nm, from about 1 nm to about 10 nm, from about 1 nm to about 5 nm, from about 1 nm to about 4 nm, from about 1 nm to about 3 nm, or from about 1 nm to about 2 nm. As another example, the basal-plane nanopores can have sizes (or a peak size or an average size) up to, or less than, about 1 nm; up to, or less than, about 1.5 nm; up to, or less than, about 2 nm; up to, or less than, about 3 nm; up to, or less than, about 5 nm; up to, or less than, about 10 nm; up to, or less than, about 20 nm; or up to, or less than, about 50 nm. In some embodiments, pore sizes can be characterized according to DFT analysis.

In some embodiments, the holey graphene oxide sheets are formed by exposing graphene oxide sheets to an etchant, and treating the etchant and the graphene oxide sheets, such as by heating at a temperature in a range of, for example, about 50° C. to about 200° C., about 50° C. to about 180° C., about 80° C. to about 150° C., about 80° C. to about 120° C., or at about 100° C. for a time interval in a range of, for example, about 0.5 h to about 10 h, about 0.5 h to about 8 h, about 0.5 h to about 6 h, about 0.5 h to about 4 h, or about 0.5 h to about 2 h. In some embodiments, the etchant can be, for example, hydrogen peroxide ($H_2O_2$). In some embodiments, a mass or weight ratio of the graphene oxide sheets in (1a) relative to the graphene oxide sheets used to form the holey graphene oxide sheets in (2) is up to about 1.5/1, up to about 1.3/1, up to about 1/1, up to about 0.8/1, up to about 0.6/1, or up to about 0.4/1. In some embodiments, the mass or weight ratio of the graphene oxide sheets in (1a) relative to the graphene oxide sheets used to form the holey graphene oxide sheets in (2) is less than about 1/1. In some embodiments, a mass or weight ratio of the graphene sheets in (1) relative to the holey graphene oxide sheets in (2) is up to about 1.5/1, up to about 1.3/1, up to about 1/1, up to about 0.8/1, up to about 0.6/1, or up to about 0.4/1. In some embodiments, the mass or weight ratio of the graphene sheets in (1) relative to the holey graphene oxide sheets in (2) is less than about 1/1.

In some embodiments, treating in (3) includes: (3a) heating at a temperature in a range of, for example, about 50° C. to about 200° C., about 50° C. to about 180° C., about 80° C. to about 150° C., about 80° C. to about 120° C., or at about 100° C. for a time interval in a range of, for example, about 0.5 h to about 10 h, about 0.5 h to about 8 h, about 0.5 h to about 6 h, about 0.5 h to about 4 h, or about 2 h, and in the presence of one or more suitable reducing agents, such as sodium ascorbate, or in an inert environment, to form a gel including the electrochemically active material; and (3b) heating the gel at a temperature in a range of, for example, about 400° C. to about 800° C., about 450° C. to about 750° C., about 500° C. to about 700° C., about 550° C. to about 650° C., or about 600° C. for a time interval in a range of, for example, about 0.5 h to about 10 h, about 0.5 h to about 8 h, about 1 h to about 6 h, about 2 h to about 4 h, or about 3 h in an inert atmosphere, to form the composite including the graphene framework loaded with the electrochemically active material.

In some embodiments, the resulting graphene framework can feature a high surface area, a high electrical conductivity, a high ion transport rate, and a high mechanical strength. For example, a specific surface area of the composite (normalized by a combined mass or weight of the composite) can be about 20 $m^2\,g^{-1}$ or more, about 25 $m^2\,g^{-1}$ or more, about 30 $m^2\,g^{-1}$ or more, about 35 $m^2\,g^{-1}$ or more, about 40 $m^2\,g^{-1}$ or more, about 45 $m^2\,g^{-1}$ or more, about 50 $m^2\,g^{-1}$ or more, about 55 $m^2\,g^{-1}$ or more, about 60 $m^2\,g^{-1}$ or more, about 65 $m^2\,g^{-1}$ or more, about 70 $m^2\,g^{-1}$ or more, about 75 $m^2\,g^{-1}$ or more, or about 80 $m^2\,g^{-1}$ or more, and up to about 90 $m^2\,g^{-1}$ or more. In some embodiments, the graphene framework includes an interconnected porous network of holey graphene sheets and (non-holey) graphene sheets, where the (non-holey) graphene sheets are substantially devoid of nanopores and are selectively loaded with, or conjugated with, the electrochemically active material, while the holey graphene sheets are substantially devoid of the electrochemically active material. In some embodiments, a mass or weight ratio of the graphene sheets relative to the holey graphene sheets is up to about 1.5/1, up to about 1.3/1, up to about 1/1, up to about 0.8/1, up to about 0.6/1, or up to about 0.4/1. In some embodiments, the mass or weight ratio of the graphene sheets relative to the holey graphene sheets is less than about 1/1. The interconnected porous network includes or defines macropores, with macropores between the holey and non-holey graphene sheets having sizes ranging from sub-micrometers to several micrometers, such as from about 5 nm, from about 10 nm, from about 100 nm, or from about 500 nm, and up to about 1 μm, up to about 5 μm, up to about 10 μm, or more, and pore walls composed of a single layer or few layers of graphene sheets. In addition, the holey graphene sheets have basal-plane or in-plane nanopores formed in the holey graphene sheets, and the nanopores can have sizes (or a peak size or an average size) in a range, for example, from about 1 nm, from about 2 nm, from about 3 nm, from about 4 nm, or from about 5 nm, and up to about 10 nm, up to about 20 nm, up to about 50 nm, up to about 100 nm, or more. For example, the basal-plane nanopores can have sizes (or a peak size or an average size) from about 1 nm to about 100 nm, from about 1 nm to about 50 nm, from about 1 nm to about 20 nm, from about 1 nm to about 10 nm, from about 1 nm to about 5 nm, from about 1 nm to about 4 nm, from about 1 nm to about 3 nm, or from about 1 nm to about 2 nm. As another example, the basal-plane nanopores can have sizes (or a peak size or an average size) up to, or less than, about 1 nm; up to, or less than, about 1.5 nm; up to, or less than, about 2 nm; up to, or less than, about 3 nm; up to, or less than, about 5 nm; up to, or less than, about 10 nm; up to, or less than, about 20 nm; or up to, or less than, about 50 nm. A mass loading of the electrochemically active material in the graphene framework (relative to a combined weight of the composite of the graphene framework and the electrochemically active material) can be about 30 wt. % or more, about 35 wt. % or more, about 40 wt. % or more, about 45 wt. % or more, about 50 wt. % or more, about 55 wt. % or more, about 60 wt. % or more, about 65 wt. % or more, about 70 wt. % or more, about 75 wt. % or more, about 80 wt. % or more, or about 85 wt. % or more, and up to about 90 wt. % or more.

The resulting composite can be used as an electrode material for energy storage devices, capacitive desalinization devices, and water purification devices, among various applications. For example, in some embodiments and referring to FIG. 6, a battery 600 includes a pair of electrodes, specifically an anode 604 and a cathode 608, and an electrolyte 606 that is disposed between the anode 604 and the cathode 608. A separator 612 also is disposed between the anode 604 and the cathode 608.

At least one of the anode 604 or the cathode 608 includes, or is formed of, a composite including a graphene framework conjugated with an electrochemically active material as described herein. In some embodiments, a mass loading of the electrochemically active material is greater than about 1 mg cm$^{-2}$, such as about 5 mg cm$^{-2}$ or greater, or about 10 mg cm$^{-2}$ or greater. For example, the mass loading of the electrochemically active material can be greater than about 10 mg cm$^{-2}$ and up to about 25 mg cm$^{-2}$ or more, such as at least about 11 mg cm$^{-2}$, at least about 12 mg cm$^{-2}$, at least about 13 mg cm$^{-2}$, at least about 14 mg cm$^{-2}$, at least about 15 mg cm$^{-2}$, at least about 16 mg cm$^{-2}$, at least about 17 mg cm$^{-2}$, at least about 18 mg cm$^{-2}$, at least about 19 mg cm$^{-2}$, at least about 20 mg cm$^{-2}$, at least about 21 mg cm$^{-2}$, or at least about 22 mg cm$^{-2}$, and at least one of the anode 604 or the cathode 608 can be characterized by an areal capacity of at least about 1 mAh cm$^{-2}$, at least about 1.5 mAh cm$^{-2}$, at least about 2 mAh cm$^{-2}$, at least about 2.5 mAh cm$^{-2}$, at least about 3 mAh cm$^{-2}$, at least about 3.5 mAh cm$^{-2}$, or at least about 3.9 mAh cm$^{-2}$, and up to about 4.5 mAh cm$^{-2}$ or more, and an areal current of at least about 100 mA cm$^{-2}$, at least about 150 mA cm$^{-2}$, at least about 200 mA cm$^{-2}$, at least about 250 mA cm$^{-2}$, at least about 300 mA cm$^{-2}$, at least about 350 mA cm$^{-2}$, at least about 400 mA cm$^{-2}$, or at least about 440 mA cm$^{-2}$, and up to about 500 mA cm$^{-2}$ or more.

In some embodiments, an electrode material of at least one of the anode 604 or the cathode 608 consists of, or consists essentially of, the graphene framework composite. In some embodiments, at least one of the anode 604 or the cathode 608 is substantially devoid of a binder and a conductive additive, such that the graphene framework conjugated with the electrochemically active material constitutes at least about 90 wt. %, at least about 93 wt. %, at least about 95 wt. %, or at least about 98 wt. % of the electrode (relative to a total weight of the electrode other than a current collector). As shown in FIG. 6, the battery 600 also includes a pair of current collectors 602 and 610, and the anode 604 and the cathode 608 are connected to the current collectors 602 and 610, respectively. Together, the anode 604 and the current collector 602 (or the cathode 608 and the current collector 610) can correspond to an electrode structure for the battery 600. It is also contemplated that either, or both, of the current collectors 602 and 610 can be omitted in some embodiments.

Example

The following example describes specific aspects of some embodiments of this disclosure to illustrate and provide a description for those of ordinary skill in the art. The example should not be construed as limiting this disclosure, as the example merely provides specific methodology useful in understanding and practicing some embodiments of this disclosure.

Methods

Synthesis of T-Nb$_2$O$_5$ and graphene aerogel electrodes. Graphene oxide (GO) was prepared by oxidation of natural graphite flakes (about 100 mesh; Sigma-Aldrich) according to a modified Hummers'method. The solution processable holey graphene oxide (HGO) was synthesized as follows. Briefly, about 5 mL of about 30% H$_2$O$_2$ aqueous solution was mixed with about 50 mL of about 2 mg mL$^{-1}$ GO aqueous dispersion and then heated at about 100° C. under stirring for about 0.5, about 1.0, and about 2.0 hours respectively. The as-prepared HGO was purified by centrifuging and washing the above mixture to remove the residual H$_2$O$_2$ and then re-dispersed in de-ionized (DI) water. The HGO along with pristine GO sheets were used as the building blocks for following hybridization stages.

T-Nb$_2$O$_5$/GF or T-Nb$_2$O$_5$/HGF composites were prepared using a two-stage hybridization process. In a typical procedure, about 50 mg anhydrous NbCl$_5$ (99.9%, Sigma-Aldrich) was dissolved in about 10 mL ethanol, while a solution of about 0.7 mL of about 2 mg mL$^{-1}$ GO in about 10 mL ethanol was prepared in a separate vial. Both solutions were cooled in an ice bath in order to prevent uncontrolled hydrolysis. The two solutions were then mixed together while about 0.5 mL oleylamine (Sigma-Aldrich) was slowly injected and heated at about 75° C. for about 6 hours in an oil bath with magnetic stirring. The intermediate product after the hydrolysis process was centrifuged and washed four times to remove excess oleylamine and ions and then freeze-dried, and annealed at about 600° C. under argon flow for about three hours. The obtained powder sample (Nb$_2$O$_5$/G) was dispersed into about 2.5 mL of about 2 mg mL$^{-1}$ GO or various HGO (with etching times from about 0.5 to about 2.0 hours) and then diluted to about 4 mL with magnetic stirring. Excess sodium ascorbate was then added into this aqueous mixture and heated at about 100° C. for about 2 hours to reduce GO or HGO-based composites into hydrogels. The as-prepared hydrogels were washed with DI water four times to remove any impurities and cut into thin slices. After freeze-drying, resulting aerogels were annealed at about 600° C. under argon flow for about three hours to further improve the electric conductivity of graphene. In the first control experiment (Method 2 in FIG. 8b), a two-stage hybridization method is utilized without thermal annealing after the first hybridization stage. In the second control experiment (Method 3 in Supplementary FIG. 8c), a single stage is used to mix with GO/HGO: about 50 mg NbCl$_5$ in about 10 mL ethanol was mixed with about 3.2 mL of about 2 mg mL$^{-1}$ GO/HGO in about 10 mL ethanol, followed by a same process to obtain hydrogels.

Synthesis of control Nb$_2$O$_5$ composites. Control sample 1: T-Nb$_2$O$_5$ and graphene powder (Nb$_2$O$_5$/G) were prepared using the same amount of $Nb_2O_5$ precursor and GO, and followed by freeze-drying and thermal annealing under the same condition to obtain the same $T-Nb_2O_5$ crystal structure. Control sample 2: $T-Nb_2O_5$ and carbon powder ($Nb_2O_5/C$) were prepared by mixing $Nb_2O_5$ precursor and poly(vinylpyrrolidinone) (PVP) in ethanol, and followed by vacuum drying and thermal annealing.

Material Characterization. The morphology and structure of materials were characterized by scanning electron microscopy (SEM, Zeiss Supra 40VP), transmission electron microscopy (TEM, Titan S/TEM FEI), and X-ray diffraction (XRD) (Panalytical X'Pert Pro X-ray Powder Diffractometer). Raman spectra were recorded on a RM 2000 Microscopic confocal Raman spectrometer (Horiba LABHR) using a 488 nm laser beam. The BET surface area and DFT pore size distribution were measured by Micromeritics ASAP 2020. Thermogravimetric analysis (TGA, PerkinElmer instruments Pyris Diamond TG/DTA) was conducted in air atmosphere from room temperature to about 750° C. at a heating rate of about 10° C. min$^{-1}$.

Electrochemical Characterization. Freestanding aerogels were pressed and directly used as working electrodes without any binders or conductive additives (tap density: about 2.0-2.2 g cm$^{-3}$). The control electrodes ($Nb_2O_5/G$ and $Nb_2O_5/C$) were prepared by mixing about 80 wt. % active materials, about 10 wt. % carbon black and about 10 wt. % poly(vinylidene fluoride) (PVDF) binder dissolved in N-methyl-2-pyrrolidinone. After the above mixture was coated on copper (Cu) foils, electrodes were dried at about 120° C. under vacuum for about 12 h to remove the solvent, and then punched into a disk and pressed. The electrochemical properties were carried out by assembly of 2025 coin cells in an argon filled glovebox with water and oxygen content kept below about 0.1 ppm. About 1.0 M lithium hexafluorophosphate ($LiPF_6$) in a mixture of ethylene carbonate (EC) and dimethyl carbonate (DMC) was used as the electrolyte (EC/DMC, about 1:1 volume ratio, BASF, USA). The typical areal mass loadings of the electrode materials are about 1, about 6, about 11, about 16, and about 22 mg cm$^{-2}$ for the studies of mass dependence. The half-cell tests were carried out using Li metal as counter and reference electrodes and $Nb_2O_5$-based composites as working electrode. Galvanostatic charge/discharge cycling was conducted in a multichannel battery testing system (LAND CT2001A). Cyclic voltammetry and electrochemical impedance spectroscopy (EIS) were carried out using VersaSTAT 4 from Princeton Applied Research. The EIS measurements were performed at open circuit potential with a sinusoidal signal in a frequency range from about 1 MHz to about 100 mHz at an amplitude of about 10 mV.

TABLE 2

Comparison of high-power intercalation based anodes

| Electrode | Mass fraction | Active mater. in electrode | Mass loading (mg cm$^{-1}$) | Retention | Rate Capacity (mA h g$^{-1}$) @ (A g$^{-1}$) | | |
|---|---|---|---|---|---|---|---|
| $Nb_2O_5$/HGF-2.0 | ~85% | 100% | 6 | 93% - 2A g$^{-1}$ 6000 cycles | 185 (185) (0.2 A g$^{-1}$) | 147 (147) (2 A g$^{-1}$) | This ex. |
| $Nb_2O_5$/HGF-2.0 | ~85% | 100% | 11 | — | 182 (182) (0.2 A g$^{-1}$) | 140 (140) (2 A g$^{-1}$) | |
| Mesoporous $Nb_2O_5$/Carbon | 88.77% | 80% | 0.4-1.4 | 80% - 2A g$^{-1}$, 2000 cycles | 160 (128) (0.1 A g$^{-1}$) | 115 (92) (5 A g$^{-1}$) | |
| $Nb_2O_5$ @ carbon core-shell | 92.9% | 80% | 0.9-1.1 | — | 150 (120) (0.2 A g$^{-1}$) | 100 (80) (2 A g$^{-1}$) | |
| T-Nb2O5 nanocrystal | 100% | 80% | 1 | — | 142 (113) (0.2 A g$^{-1}$) | 130 (104) (2 A g$^{-1}$) | |
| $Nb_2O_5$ sheet | 100% | 80% | — | 77% - 1A g$^{-1}$, 200 cycles | 160 (128) (0.2 A g$^{-1}$) | 90 (72) (1 A g$^{-1}$) | |
| $Nb_2O_5$-Graphene | 66.37% | 100% | — | 91.2% - 2A g$^{-1}$, 50 cycles | 151 (100) (0.2 A g$^{-1}$) | 120 (80) (2 A g$^{-1}$) | |
| $Nb_2O_5$ nanowires | 90.9% | 80% | 2 | 82% - 1A g$^{-1}$, 1000 cycles | 183 (146) (0.1 A g$^{-1}$) | 140 (112) (5 A g$^{-1}$) | |

Notes:
All gravimetric capacities are normalized by the active materials (composites); capacities in the brackets are normalized by the total mass of the electrode including conductive additives and binders.

Notes: All gravimetric capacities are normalized by the active materials (composites); capacities in the brackets are normalized by the total mass of the electrode including conductive additives and binders.

TABLE 3

Kinetic parameters of electrodes (about 6 mg cm$^{-2}$) with various porosities

| Electrode | Re (Ω) | Rct (Ω) | σ (Ω Hz$^{1/2}$) |
|---|---|---|---|
| $Nb_2O_5$/GF | 2.1 | 25 | 43 |
| $Nb_2O_5$/HGF-0.5 | 2.1 | 20 | 35 |
| $Nb_2O_5$/HGF-1.0 | 1.9 | 17 | 26 |
| $Nb_2O_5$/HGF-2.0 | 1.8 | 16 | 20 |

TABLE 4

Kinetic parameters of electrodes with various areal mass loadings

| | Re (Ω) | | Rct (Ω) | | σ (Ω Hz$^{1/2}$) | | |
|---|---|---|---|---|---|---|---|
| Mass loading (mg cm$^{-2}$) | 6 | 1 | 6 | 11 | 1 | 6 | 11 |
| $Nb_2O_5$/HGF-2.0 | 1.8 | 15 | 16 | 18 | 17 | 20 | 24 |
| $Nb_2O_5$/GF | 2.1 | 23 | 25 | 34 | 28 | 43 | 55 |
| $Nb_2O_5$/G | 2.4 | 41 | 68 | 82 | 34 | 59 | 67 |
| $Nb_2O_5$/C | 2.6 | 113 | 145 | 176 | 37 | 64 | 76 |

As used herein, the singular terms "a," "an," and "the" may include plural referents unless the context clearly dictates otherwise. Thus, for example, reference to an object may include multiple objects unless the context clearly dictates otherwise.

As used herein, the term "set" refers to a collection of one or more objects. Thus, for example, a set of objects can include a single object or multiple objects.

As used herein, the terms "connect," "connected," and "connection" refer to an operational coupling or linking. Connected objects can be directly coupled to one another or can be indirectly coupled to one another, such as via one or more other objects.

As used herein, the term "size" refers to a characteristic dimension of an object. Thus, for example, a size of an object that is circular or spherical can refer to a diameter of the object. In the case of an object that is non-circular or non-spherical, a size of the object can refer to a diameter of a corresponding circular or spherical object, where the corresponding circular or spherical object exhibits or has a particular set of derivable or measurable properties that are substantially the same as those of the non-circular or non-spherical object. When referring to a set of objects as having a particular size, it is contemplated that the objects can have a distribution of sizes around the particular size. Thus, as used herein, a size of a set of objects can refer to a typical size of a distribution of sizes, such as an average size, a median size, or a peak size.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Additionally, concentrations, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a range of about 1 to about 200 should be understood to include the explicitly recited limits of about 1 and about 200, but also to include individual values such as about 2, about 3, and about 4, and sub-ranges such as about 10 to about 50, about 20 to about 100, and so forth.

While the disclosure has been described with reference to the specific embodiments thereof, it should be understood by those skilled in the art that various changes may be made and equivalents may be substituted without departing from the true spirit and scope of the disclosure as defined by the appended claims. In addition, many modifications may be made to adapt a particular situation, material, composition of matter, method, operation or operations, to the objective, spirit and scope of the disclosure. All such modifications are intended to be within the scope of the claims appended hereto. In particular, while certain methods may have been described with reference to particular operations performed in a particular order, it will be understood that these operations may be combined, sub-divided, or re-ordered to form an equivalent method without departing from the teachings of the disclosure. Accordingly, unless specifically indicated herein, the order and grouping of the operations are not a limitation of the disclosure.

What is claimed is:

1. A method of forming an electrode material, comprising:
   (a) loading an electrochemically active material onto graphene sheets to form electrochemically active material-loaded graphene sheets;
   (b) combining the electrochemically active material-loaded graphene sheets with holey graphene oxide sheets to form a mixture; and
   (c) treating the mixture under reducing conditions to form a composite including a graphene framework loaded with the electrochemically active material,
      wherein the graphene framework comprises an interconnected porous network of both non-holey graphene sheets and holey graphene sheets.

2. The method of claim 1, wherein the loading the electrochemically active material includes:
   (a) loading a precursor of the electrochemically active material onto graphene oxide sheets; and
   (b) treating the precursor-loaded graphene oxide sheets under reducing conditions to form the electrochemically active material-loaded graphene sheets.

3. The method of claim 1, wherein the treating the mixture includes:
   (a) heating the mixture in the presence of a reducing agent to form a gel including the electrochemically active material; and
   (b) heating the gel to form the composite.

4. The method of claim 3, wherein the treating the mixture is performed in the presence of an unsaturated fatty amine.

5. The method of claim 3, wherein the treating the mixture is performed in an inert atmosphere.

6. The method of claim 3, wherein the heating the mixture is performed at a temperature of 400° C. to 800° C.

7. The method of claim 1, wherein the electrochemically active material comprises nanostructures of an anode material or a cathode material.

8. The method of claim 7, wherein the cathode material comprises sulfur(S), phosphorus (P), lithium cobalt oxide, lithium manganese oxide, lithium nickel manganese cobalt oxide, lithium iron phosphate, lithium nickel cobalt aluminum oxide, lithium titanate, $LiO_2$, $LiO_2$, or any combination thereof.

9. The method of claim 7, wherein the anode material comprises silicon (Si), tin (Sn), germanium (Ge), antimony (Sb), iron oxide, niobia, tin oxide, or any combination thereof.

10. The method of claim 7, wherein the nanostructures have a dimension of 1 nm to 200 nm.

11. The method of claim 1, wherein the holey graphene oxide sheets have basal-plane nanopores of sizes up to 100 nm.

12. The method of claim 1, wherein the electrochemically active material is selectively loaded onto the non-holey graphene sheets only.

13. The method of claim 12, wherein a mass ratio of the non-holey graphene sheets relative to the holey graphene sheets is up to 1.5/1.

14. The method of claim 1, wherein the graphene framework comprises macropores between the non-holey graphene sheets and the holey graphene sheets.

15. The method of claim 14, wherein the macropores have a size of 100 nanometers to 10 micrometers.

16. The method of claim 1, further comprising forming the holey graphene oxide sheets by exposing graphene oxide sheets to an etchant.

17. The method of claim 1, wherein a mass loading of the electrochemically active material in the electrode material is at least 50 wt. %.

18. The method of claim 1, wherein a mass loading of the electrochemically active material in the electrode material is at least 6 mg per square centimeter.

19. The method of claim 1, wherein a specific surface area of the electrode material is at least 50 square meters per gram.

* * * * *